(12) United States Patent
Cayer et al.

(10) Patent No.: US 11,867,923 B1
(45) Date of Patent: Jan. 9, 2024

(54) LOW-SPECKLE LASER LINE GENERATOR

(71) Applicant: OSELA INC., Montreal (CA)

(72) Inventors: Francis Cayer, Montreal (CA); Jules Lemonde-Trudeau, Montreal (CA)

(73) Assignee: Osela Inc., Montreal (CA)

( * ) Notice: Subject to any disclaimer, the term of this patent is extended or adjusted under 35 U.S.C. 154(b) by 0 days.

(21) Appl. No.: 18/210,271

(22) Filed: Jun. 15, 2023

Related U.S. Application Data

(60) Provisional application No. 63/366,474, filed on Jun. 16, 2022.

(51) Int. Cl.
| | |
|---|---|
| *G02B 27/14* | (2006.01) |
| *G02B 27/48* | (2006.01) |
| *G02B 5/18* | (2006.01) |
| *G02B 1/10* | (2015.01) |
| *G02B 3/02* | (2006.01) |

(52) U.S. Cl.
CPC .............. *G02B 27/48* (2013.01); *G02B 1/10* (2013.01); *G02B 3/02* (2013.01); *G02B 5/1814* (2013.01); *G02B 5/1857* (2013.01)

(58) Field of Classification Search
CPC .... G02B 27/48; G02B 5/1814; G02B 5/1857; G02B 27/42; G02B 27/148
See application file for complete search history.

(56) References Cited

U.S. PATENT DOCUMENTS

| | | |
|---|---|---|
| 4,826,299 A | 5/1989 | Powell |
| 4,946,253 A | 8/1990 | Kostuck |
| 7,028,899 B2 | 4/2006 | Tsikos et al. |
| 10,042,172 B2 | 8/2018 | Doucet et al. |
| 11,036,057 B2 | 6/2021 | Filhaber |
| 2003/0098349 A1 | 5/2003 | Tsikos et al. |
| 2004/0257664 A1* | 12/2004 | Hashimoto .......... G02B 27/143 359/636 |
| 2006/0017902 A1 | 1/2006 | Rhyzhikov et al. |

(Continued)

FOREIGN PATENT DOCUMENTS

WO      2008141776 A1      11/2008

OTHER PUBLICATIONS

Tong, Zhaomin, et al. "Equal-intensity beam splitter fabricated by segmented half-wave plate for passive laser speckle reduction." Optics Letters 46.16 (2021): 3965-3968.

(Continued)

*Primary Examiner* — Ryan D Howard
(74) *Attorney, Agent, or Firm* — Erise IP, P.A.

(57) ABSTRACT

A laser line generating assembly for projecting a low-speckle laser line is provided. The laser line generating includes a laser source, a beam divider and a sub-beam converter. The laser source generating a laser beam having a temporal coherence. The beam divider divides the laser beam into incoherent multiple sub-beams propagating in a same propagation plane. The sub-beam converter generates a plurality of laser light sheets, each laser light sheet being associated with a corresponding one of the sub-beams. Each laser light sheet extends within the propagation plane. The laser light sheets intersect a projection plane to define laser line elements overlapping at least partially to form said low-speckle laser line, the laser line elements having respective speckle patterns which are at least partially uncorrelated.

22 Claims, 26 Drawing Sheets

(56) References Cited

U.S. PATENT DOCUMENTS

2006/0066870 A1  3/2006  Korngut et al.
2007/0070302 A1  3/2007  Govorkov et al.

OTHER PUBLICATIONS

PCT Patent Application PCT/CA2023/050825 International Search Report dated Sep. 27, 2023.
PCT Patent Application PCT/CA2023/050825 Written Opinion of the International Searching Authority dated Sep. 27, 2023.

* cited by examiner

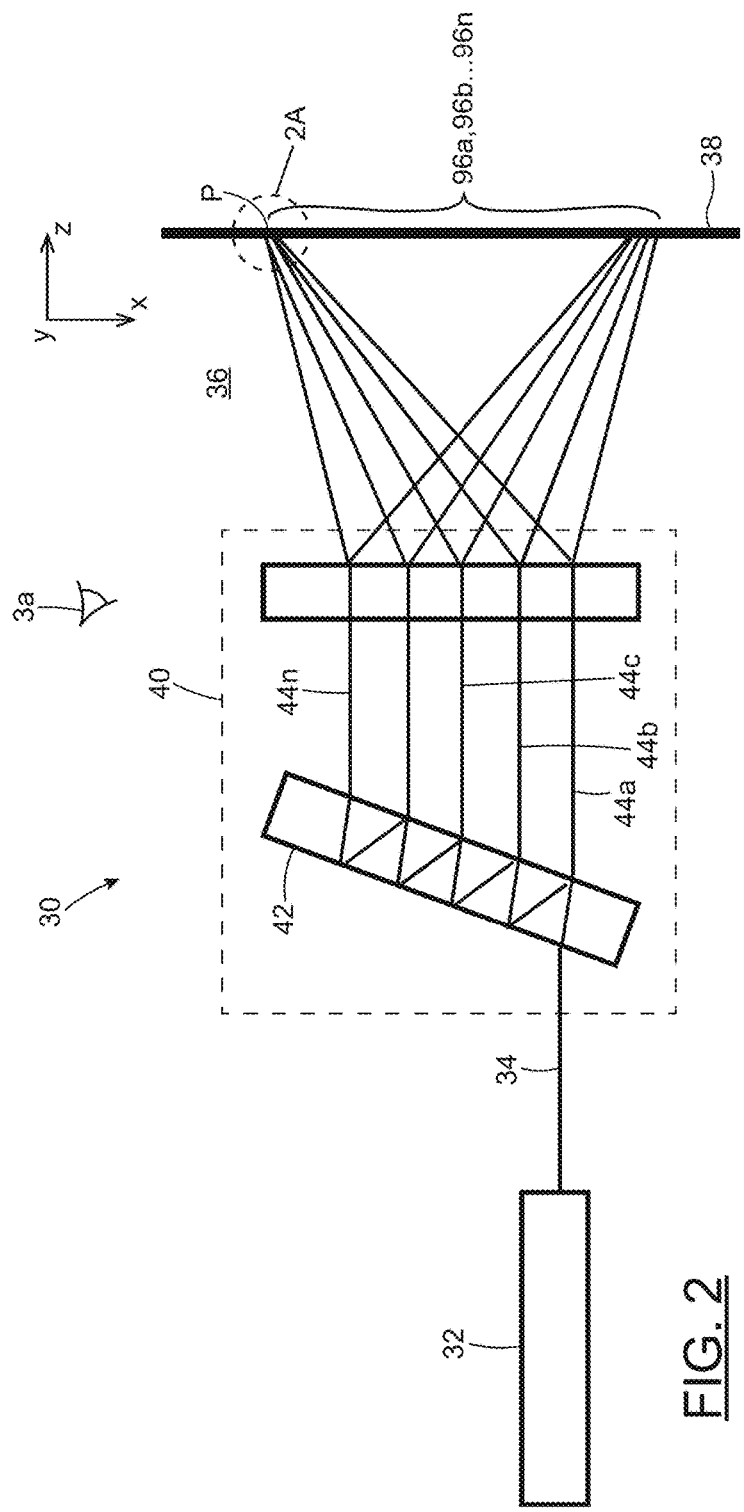
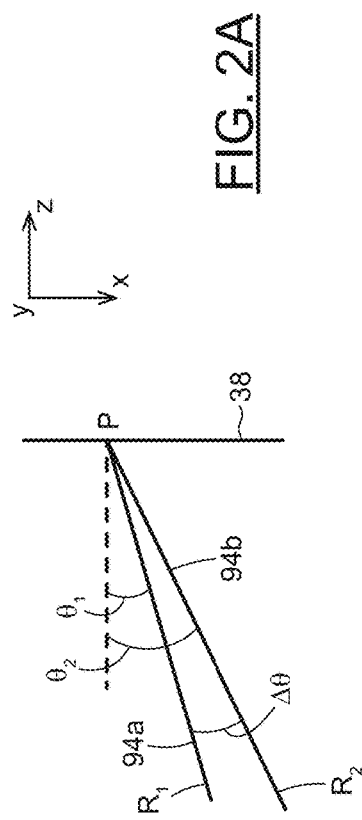
FIG. 2
FIG. 2A

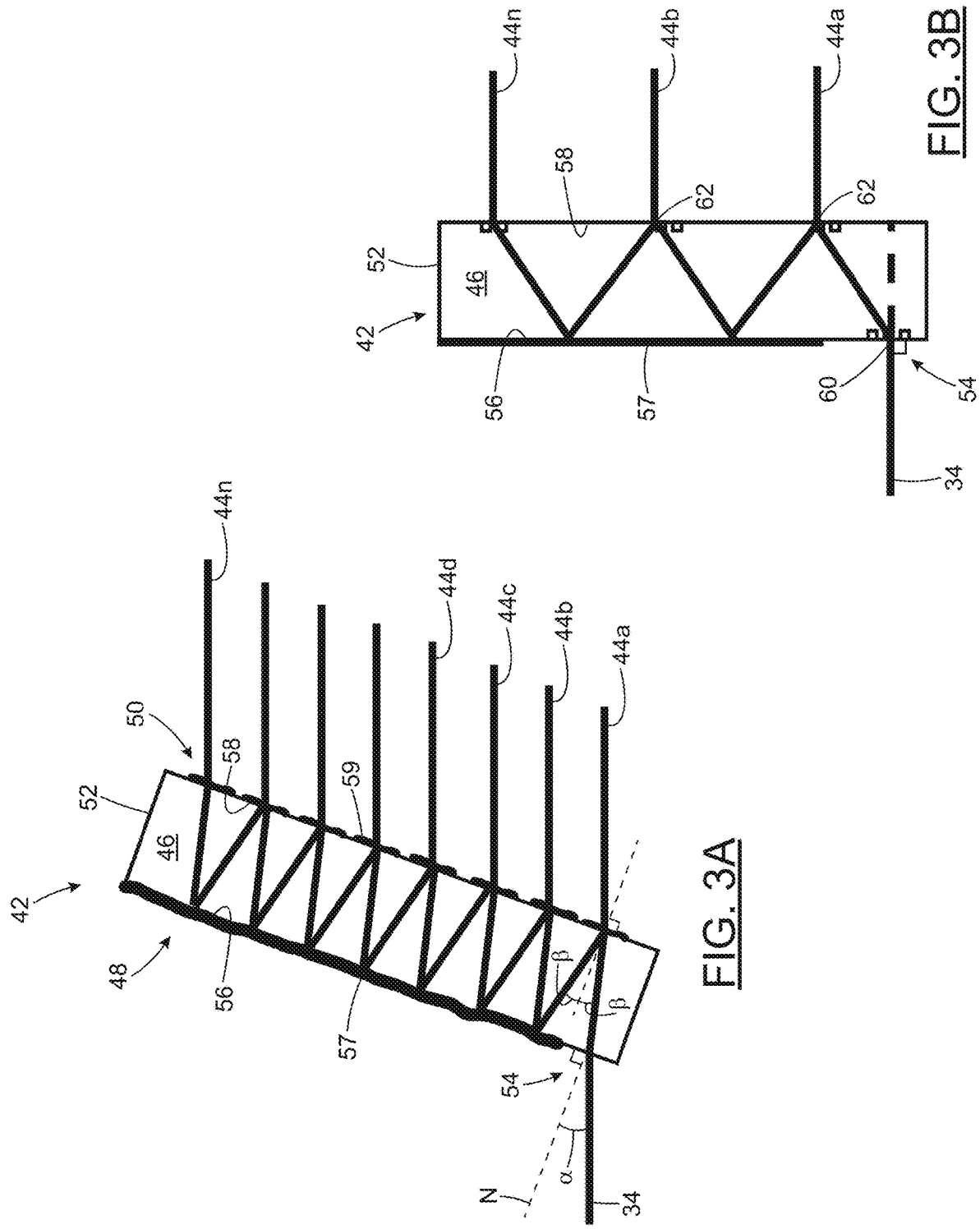

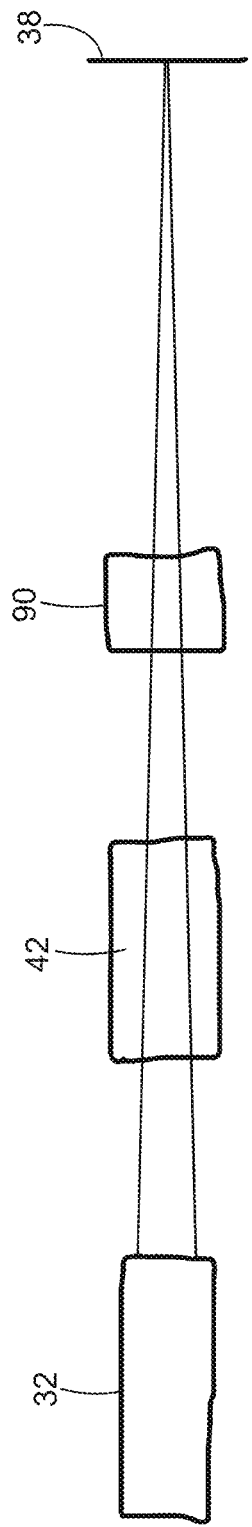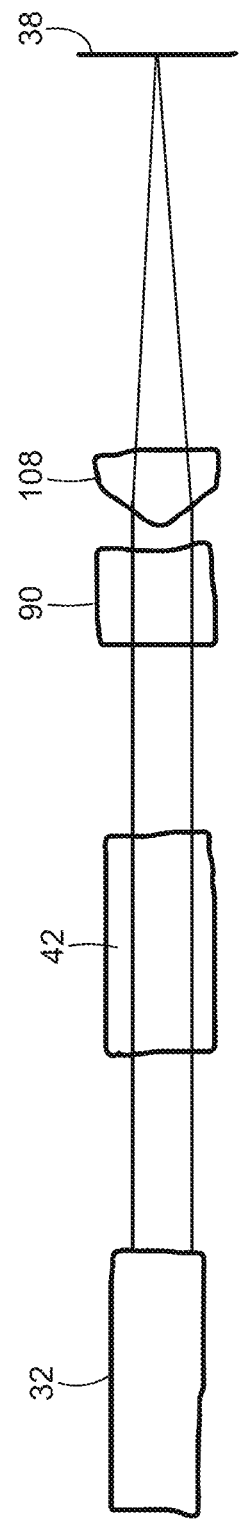

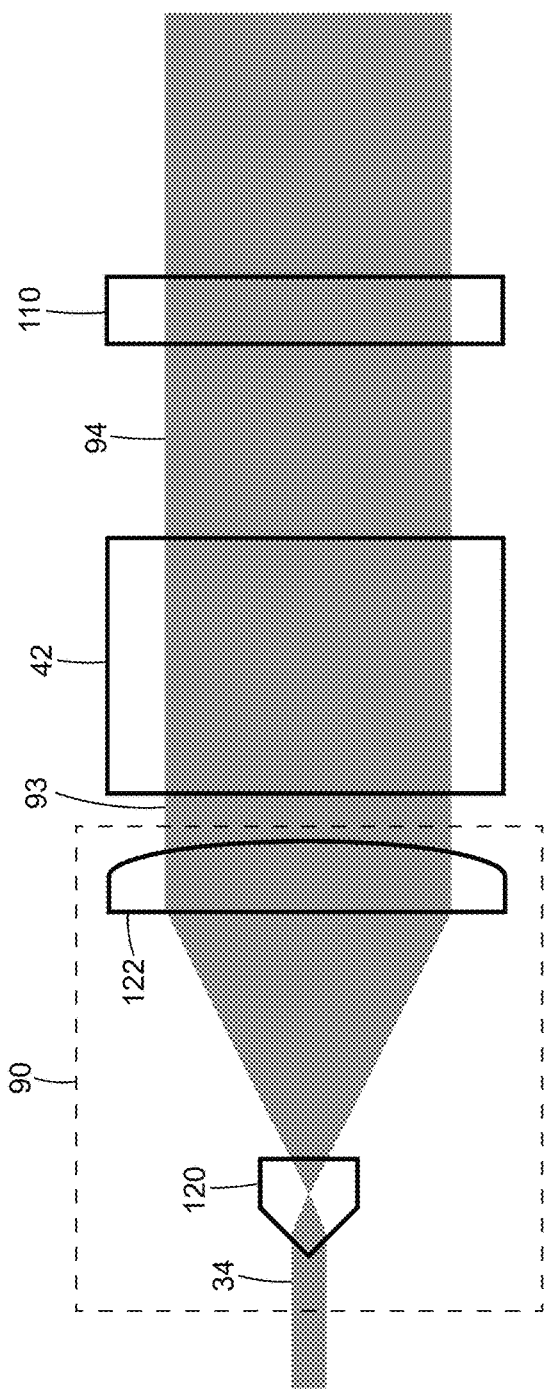
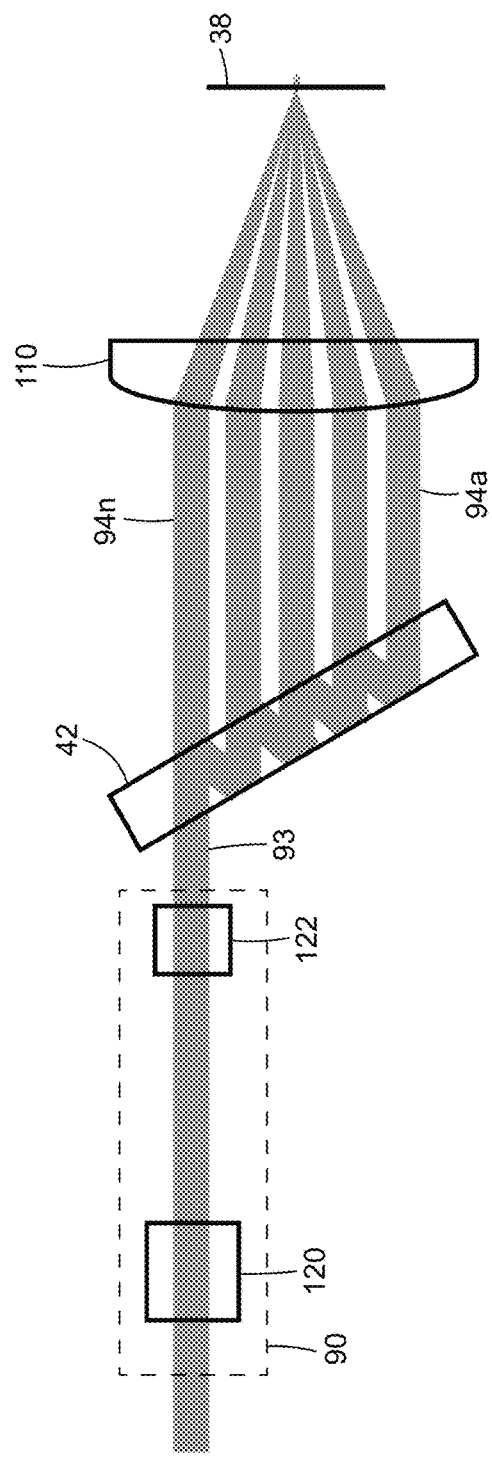
FIG. 16A
FIG. 16B

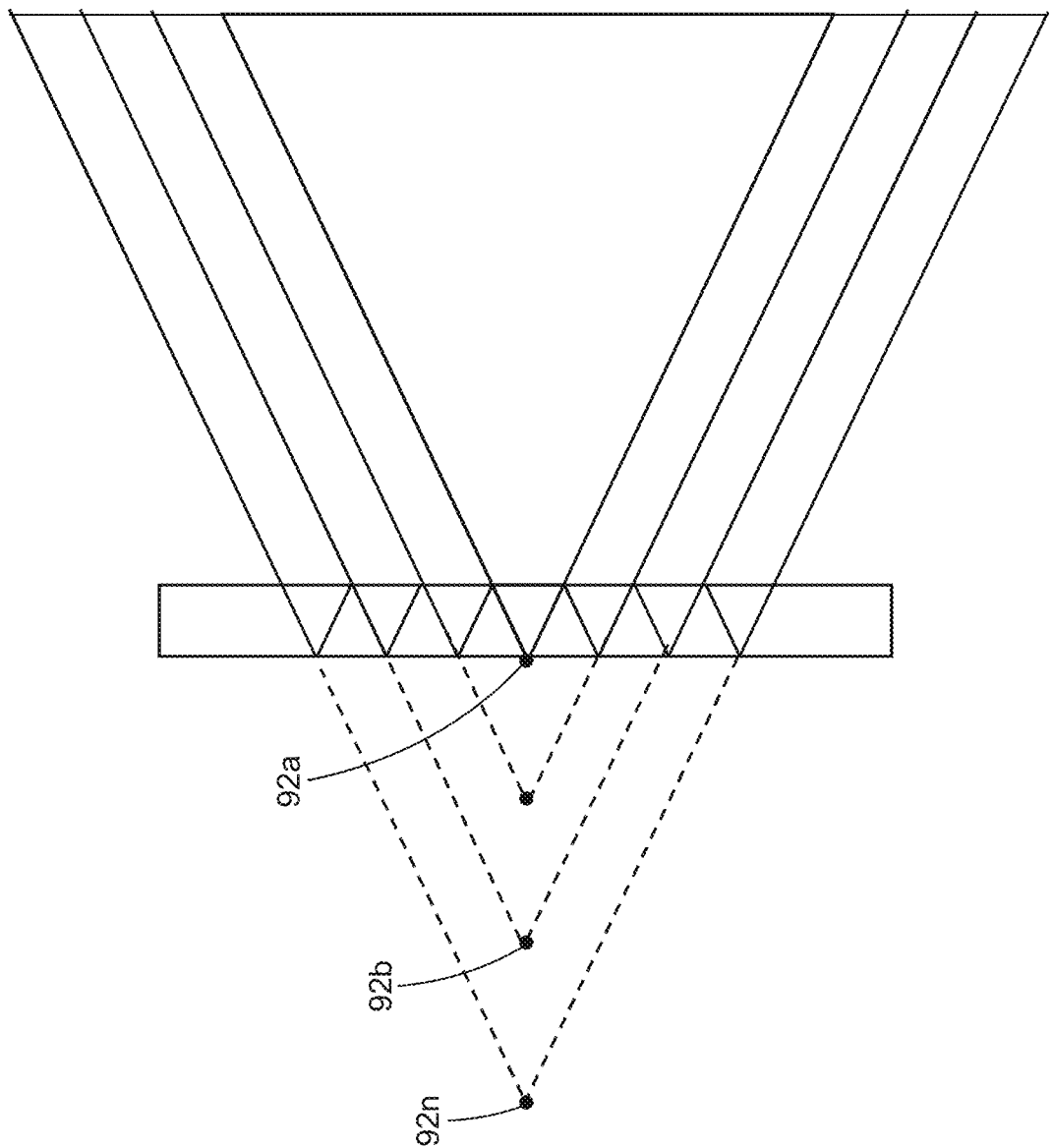

LOW-SPECKLE LASER LINE GENERATOR

RELATED APPLICATION

This patent application incorporates by reference, in its entirety, and claims priority to U.S. Provisional Patent Application Ser. No. 63/366,474, filed Jun. 16, 2022.

TECHNICAL FIELD

The technical field generally relates to the mitigation of speckle in laser lines and more particularly concerns laser line generating assembly and laser line generator for projecting a low-speckle laser line at a projection plane.

BACKGROUND

The term "speckle" is used in the art to designate random granular patterns which can be observed in the projection of a laser line or 2D-shape on a rough surface. The appearance of the light reflected by such a surface typically includes variations in intensity, or bright and dark "specks" in the reflected pattern, resulting in a shape that deviates from the line of uniform intensity typically desired for various applications. The speckle effect is a result of the constructive and destructive interference of light waves that take place when coherent light, such as a laser beam, is used as the light source.

Speckle is often considered problematic for applications in which laser line generators are used. For example, in industrial machine vision systems or the like, an object is illuminated by a laser line and the deviations of the shape and spatial characteristics of the reflected light from the illuminating pattern are analysed to provide information on the illuminated surface. The variations in light intensity of speckle cause measurement errors.

There remains a need for improvements in laser line generation that mitigates the impact of speckle.

SUMMARY

In accordance with one aspect, there is provided a laser line generating assembly for projecting a low-speckle laser line at a projection plane, the laser line generating assembly comprising:
  a laser source generating a laser beam having a temporal coherence characterized by a coherence length;
  a laser line generator, comprising:
    a beam divider configured to divide the laser beam into incoherent multiple sub-beams propagating in a same propagation plane; and
    a sub-beam converter generating a plurality of laser light sheets, each laser light sheet being associated with a corresponding one of the sub-beams, each laser light sheet extending within the propagation plane, the laser light sheets intersecting the projection plane to define laser line elements overlapping at least partially to form said low-speckle laser line, the laser line elements having respective speckle patterns which are at least partially uncorrelated.

In some implementations, the beam divider is provided upstream of the sub-beam converter along a path of the laser beam. In other implementations, the sub-beam converter is provided upstream of the beam divider along a path of the laser beam.

In some implementations, the beam divider comprises a light cavity reflecting the laser beam for multiple passes, the laser beam having an optical path within each of said passes longer than the coherence length, each of said passes generating one of said sub-beams.

In some implementations, the light cavity comprises a high reflectivity reflector and a partially reflective reflector extending in parallel. The light cavity may comprise a rectangular transparent block, and the high reflectivity reflector and the partially reflective reflector may be defined by reflective coating layers provided along respective back and front surfaces of the rectangular transparent block. The reflective coating layers may metallic or dielectric components. In some implementations, the reflective coating layer defining the partially reflective reflector may be configured such that all of the sub-beams substantially contain a same light power. In some implementations, the reflective coating layer defining the partially reflective reflector may have a varying thickness along the front surface. In some implementations, the light cavity may comprise a light input comprising a portion of the back surface of the rectangular transparent block free of the reflective coating layer defining the high reflectivity reflector.

In some implementations, the light cavity may comprise a light input positioned to receive the laser beam within the light cavity at an input angle α having a non-zero value with respect to a normal N to a plane of the high reflectivity reflector.

In some implementations, the beam divider comprises a plurality of partially reflective mirrors positioned sequentially in a path of the laser beam.

In some implementations, the beam divider comprises a transparent block made of a low reflective index material and an input block made of a high reflective index material, the input block having a side surface contiguous with a side surface of the transparent block.

In some implementations, the sub-beam converter comprises a diffraction grating.

In some implementations, the sub-beam converter comprises a diffuser.

In some implementations, the sub-beam converter comprises one or more line-generating lenses.

In some implementations, the sub-beam converter comprises an array of line-generating microlenses.

In some implementations, the sub-beam converter comprises a cylindrical lens.

In some implementations, the sub-beam converter further comprises a beam conditioning block.

In some implementations, the sub-beam converter comprises:
  a line-generating lens disposed in a path of the laser beam between the laser source and the light cavity and designed to fan out said laser beam in one direction within the propagation plane, each of the multiple sub-beams therefore having a fanned-out shape within said propagation plane; and
  a bulk diffraction grating positioned across the propagation plane so as to intersect said multiple sub-beams, said bulk diffraction grating diffracting each sub-beam into a plurality of diffraction orders spread across said one direction within the propagation plane, thereby providing a plurality of images of said sub-beam;
  wherein the plurality of images of each sub-beam forms the laser light sheet associated with the corresponding sub-beam. The line-generating lens may be an acylindrical lens or a linear deiverging lens. The bulk diffraction grating may comprise a planar glass substrate and a holographic pattern engraved or photoinduced in said planar glass substrate. The bulk diffraction grating may alternatively comprise a planar glass substrate and a plurality of meta surfaces deposited on a surface of said planar glass substrate. In one variant, the laser source is a single-mode laser diode. In some implementations, a beam conditioning block positioned before or after the bulk diffraction grating. In some implementations, a pseudo-telecentric illumination module provided between the bulk diffraction grating and the projection plane. The pseudo-telecentric illumination module may comprise first and second lenses, the first lens having a curvature configured to redirect the laser light sheets exiting the bulk diffraction grating into pseudo-parallel light sheets, and the second lens having a curvature configured to focus the pseudo-parallel laser light sheets to form a thin line on the projection plane.

In some implementations, the sub-beam converter comprises a series of line-generating lenses positioned in the paths of the sub-beams and each designed to fan out the corresponding one of the sub-beams, and a cylindrical lens positioned between the series of line-generating lenses and the projection plane.

In some implementations, the sub-beam converter is configured to convert each sub-beam into a point source generating the corresponding laser light sheet.

In some implementations, the beam divider and the sub-beam converter are integrated in a monolithic component.

In accordance with another aspect, there is provided a laser line generator for projecting a low-speckle laser line at a projection plane, the laser line generator configured to received as input a laser beam having a temporal coherence characterized by a coherence length, the laser line generator comprising:

a beam divider configured to divide the laser beam into incoherent multiple sub-beams propagating in a same propagation plane; and a sub-beam converter generating a plurality of laser light sheets, each laser light sheet being associated with a corresponding one of said sub-beams, each laser light sheet extending within the propagation plane, the laser light sheets intersecting the projection plane to define laser line elements overlapping at least partially to form said low-speckle laser line, the laser line elements having respective speckle patterns which are at least partially uncorrelated.

In some implementations, the beam divider is provided upstream of the sub-beam converter along a path of the laser beam. In alternative implementations, the sub-beam converter is provided upstream of the beam divider along a path of the laser beam.

In some implementations, the beam divider comprises a light cavity reflecting the laser beam for multiple passes, the laser beam having an optical path within each of said passes longer than the coherence length, each of said passes generating one of said sub-beams.

In some implementations, the beam divider comprises a plurality of partially reflective mirrors positioned sequentially in a path of the laser beam.

In some implementations, the beam divider comprises a transparent block made of a low reflective index material and an input block made of a high reflective index material, the input block having a side surface contiguous with a side surface of the transparent block.

In some implementations, the sub-beam converter comprises a diffraction grating.

In some implementations, the sub-beam converter comprises a diffuser.

In some implementations, the sub-beam converter comprises an array of microlenses.

In some implementations, the sub-beam converter comprises a cylindrical lens.

In some implementations, the sub-beam converter further comprises a beam conditioning block, a unidimensional diffuser or a grating.

In some implementations, the sub-beam converter comprises one or more line-generating cylindrical lenses.

In some implementations, the sub-beam converter is configured to convert each sub-beam into a point source generating the corresponding laser light sheet.

In some implementations, the beam divider and the sub-beam converter are integrated in a monolithic component.

In some implementations, the laser source is a single mode laser diode, and the sub-beam converter comprises a line-generating cylindrical lens positioned between the laser diode and the beam divider.

In accordance with another aspect, there is provided a laser line generating assembly for projecting a low-speckle laser line at a projection plane, the laser line generating assembly comprising:

a laser source generating a laser beam having a temporal coherence characterized by a coherence length;

a high reflectivity reflector and a partially reflective reflector extending in parallel and defining a light cavity therebetween, the light cavity having a light input configured to receive the laser so that said laser beam is reflected within said light cavity for multiple passes, the laser beam having an optical path within each of said passes longer than the coherence length, each of said passes generating one of multiple incoherent sub-beams propagating in a same propagation plane;

a line-generating lens disposed in a path of the laser beam between the laser source and the light cavity and designed to fan out said laser beam in one direction within the propagation plane, each of the multiple sub-beams therefore having a fanned-out shape within said propagation plane; and a bulk diffraction grating positioned across the propagation plane so as to intersect said multiple sub-beams, said bulk diffraction grating diffracting each sub-beam into a plurality of diffraction orders spread across said one direction within the propagation plane, thereby providing a plurality of images of said sub-beam;

whereby the plurality of images of each sub-beam forms a corresponding laser light sheet extending within the propagation plane, the laser light sheets intersecting the projection plane to define laser line elements overlapping at least partially to form said low-speckle laser line, the laser line elements having respective speckle patterns which are at least partially uncorrelated.

In some implementations, the laser source is a laser diode.

In some implementations, the light cavity comprises a rectangular transparent block, and the high reflectivity reflector and the partially reflective reflector being defined by reflective coating layers provided along respective back and front surfaces of the rectangular transparent block. The reflective coating layers may be metallic or dielectric components. The reflective coating layer defining the partially reflective reflector may be configured such that all of the sub-beams substantially contain a same light power. The reflective coating layer defining the partially reflective reflector may have a varying thickness along the front surface.

In some implementations, the light input consists of a portion of the back surface of the rectangular transparent block free of the reflective coating layer defining the high reflectivity reflector.

In some implementations, the light input is positioned to receive the laser beam within the light cavity at an input angle α having a non-zero value with respect to a normal N to a plane of the high reflectivity reflector.

In some implementations, the line-generating lens is an acylindrical lens.

In some implementations, the line-generating lens is a linear deiverging lens.

In some implementations, the bulk diffraction grating comprises a planar glass substrate and a holographic pattern engraved or photoinduced in said planar glass substrate.

In some implementations, the bulk diffraction grating comprises a planar glass substrate and a plurality of meta-surfaces deposited on a surface of said planar glass substrate.

In accordance with another aspect, there is provided a laser line generator for projecting a low-speckle laser line at a projection plane, the laser line generator configured to received as input a laser beam having a temporal coherence characterized by a coherence length, the laser line generator comprising:

a high reflectivity reflector and a partially reflective reflector extending in parallel and defining a light cavity therebetween, the light cavity having a light input configured to receive the laser beam from the line-generating lens so that said laser beam is reflected within said light cavity for multiple passes, the laser beam having an optical path within each of said passes longer than the coherence length, each of said passes generating one of multiple incoherent sub-beams propagating in a same propagation plane;

a line-generating lens disposed in a path of the laser beam between the laser source and the light cavity and designed to fan out said laser beam in one direction within the propagation plane, each of the multiple sub-beams therefore having a fanned-out shape within said propagation plane; and a bulk diffraction grating positioned across the propagation plane so as to intersect said multiple sub-beams, said bulk diffraction grating diffracting each sub-beam into a plurality of diffraction orders spread across said one direction within the propagation plane, thereby providing a plurality of images of said sub-beam;

whereby the plurality of images of each sub-beam forms a corresponding laser light sheet extending within the propagation plane, the laser light sheets intersecting the projection plane to define laser line elements overlapping at least partially to form said low-speckle laser line, the laser line elements having respective speckle patterns which are at least partially uncorrelated.

In some implementations, the light cavity comprises a rectangular transparent block, and the high reflectivity reflector and the partially reflective reflector being defined by reflective coating layers provided along respective back and front surfaces of the rectangular transparent block. The reflective coating layers may be metallic or dielectric components. The reflective coating layer defining the partially reflective reflector may be configured such that all of the sub-beams substantially contain a same light power. The reflective coating layer defining the partially reflective reflector may have a varying thickness along the front surface.

In some implementations, the light input consists of a portion of the back surface of the rectangular transparent block free of the reflective coating layer defining the high reflectivity reflector.

In some implementations, the light input is positioned to receive the laser beam within the light cavity at an input angle α having a non-zero value with respect to a normal N to a plane of the high reflectivity reflector.

In some implementations, the line-generating lens is an acylindrical lens.

In some implementations, the line-generating lens is a linear deiverging lens.

In some implementations, the bulk diffraction grating comprises a planar glass substrate and a holographic pattern engraved or photoinduced in said planar glass substrate.

Advantageously, laser line generating assemblies or laser line generators as described herein may provide an improvement in the uniformity of laser lines, and/or increase the size of the apparent source, hence providing greater power within a same laser safety class.

Features and advantages of the invention will be better understood upon reading of embodiments thereof with reference to the appended drawings.

BRIEF DESCRIPTION OF THE DRAWINGS

FIG. 2 is a side view of the schematized laser line generating assembly of FIG. 1; FIG. 2A is an enlarged view of area 2A of FIG. 2.

FIGS. 3A to 3D schematically illustrated different variants of a beam divider.

FIGS. 10A and 10B are side view of the laser line generating assembly of FIG. 9 without and with such cylindrical lens.

FIGS. 16A and 16B are respective top and side views of a configuration providing a collimated laser line projector.

FIG. 17B illustrates the equivalent point sources of the configuration of FIG. 17A.

DETAILED DESCRIPTION

Figure 1:
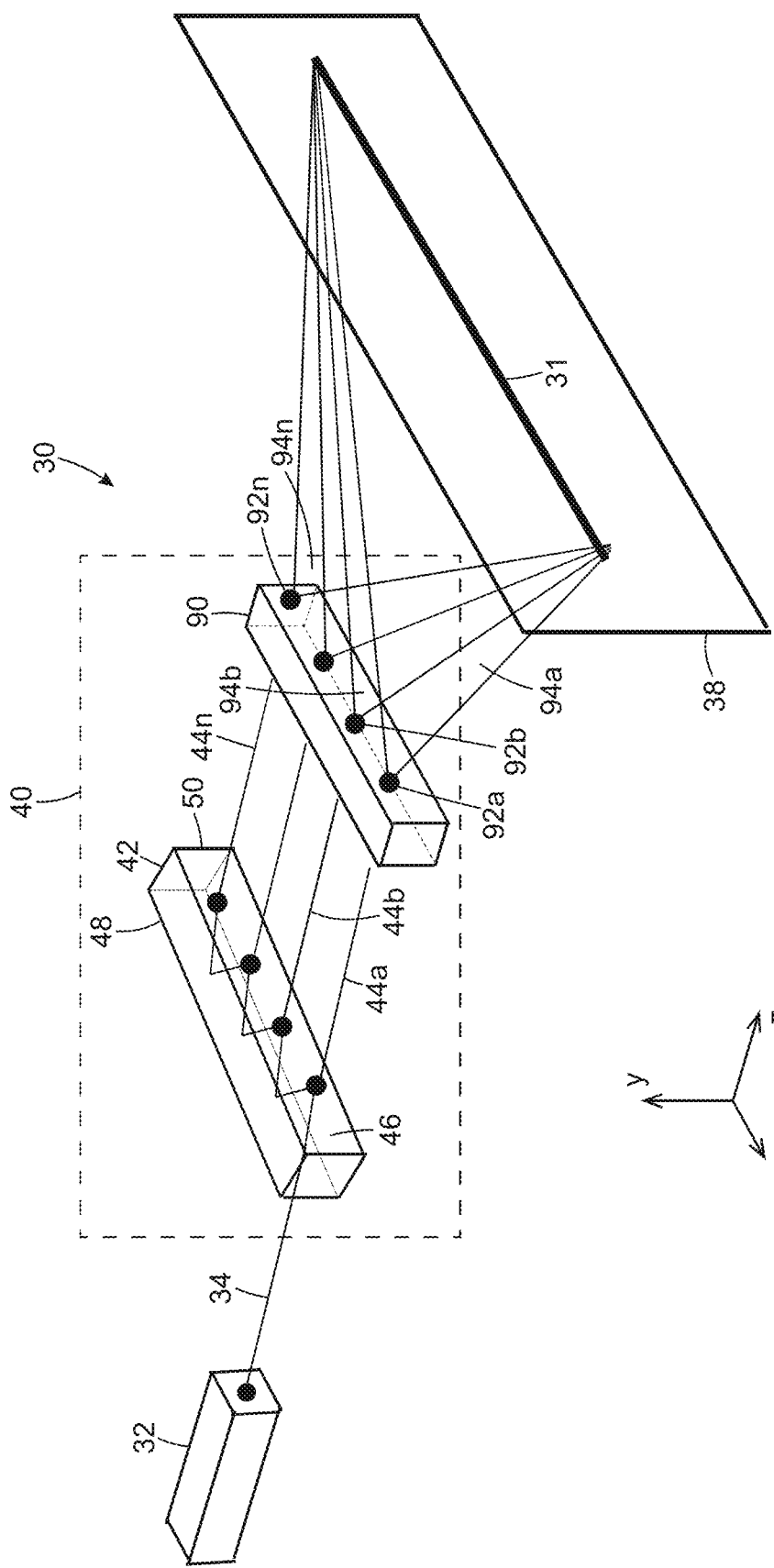
FIG. 1 is an elevation view of a schematized laser line generating assembly according to one embodiment.

In the following description, similar features in the drawings have been given similar reference numerals. In order not to unduly encumber the figures, some elements may not be indicated on some figures if they were already mentioned in preceding figures. It should also be understood herein that the elements of the drawings are not necessarily drawn to scale and that the emphasis is instead being placed upon clearly illustrating the elements and structures of the present embodiments.

The terms "a", "an" and "one" are defined herein to mean "at least one", that is, these terms do not exclude a plural number of items, unless stated otherwise. Terms such as "substantially", "generally" and "about", that modify a value, condition or characteristic of a feature of an exemplary embodiment, should be understood to mean that the value, condition or characteristic is defined within tolerances that are acceptable for the proper operation of this exemplary embodiment for its intended application.

Unless stated otherwise, the terms "connected" and "coupled", and derivatives and variants thereof, refer herein to any structural or functional connection or coupling, either direct or indirect, between two or more elements. For example, the connection or coupling between the elements may be mechanical, optical, electrical, logical, or any combination thereof.

In the present description, the terms "light" and "optical", and variants and derivatives thereof, are used to refer to radiation in any appropriate region of the electromagnetic spectrum. The terms "light" and "optical" are therefore not limited to visible light, but can also include, without being limited to, the infrared or ultraviolet regions of the electromagnetic spectrum. Also, the skilled person will appreciate that the definition of the ultraviolet, visible and infrared ranges in terms of spectral ranges, as well as the dividing lines between them, may vary depending on the technical field or the definitions under consideration, and are not meant to limit the scope of applications of the present techniques.

To provide a more concise description, some of the quantitative expressions given herein may be qualified with the term "about". It is understood that whether the term "about" is used explicitly or not, every quantity given herein is meant to refer to an actual given value, and it is also meant to refer to the approximation to such given value that would reasonably be inferred based on the ordinary skill in the art, including approximations due to the experimental and/or measurement conditions for such given value.

In the present description, the term "about" means within an acceptable error range for the particular value as determined by one of ordinary skill in the art, which will depend in part on how the value is measured or determined, i.e. the limitations of the measurement system. It is commonly accepted that a 10% precision measure is acceptable and encompasses the term "about".

In the present description, when a broad range of numerical values is provided, any possible narrower range within the boundaries of the broader range is also contemplated. For example, if a broad range value of from 0 to 1000 is provided, any narrower range between 0 and 1000 is also contemplated. If a broad range value of from 0 to 1 is mentioned, any narrower range between 0 and 1, i.e. with decimal value, is also contemplated.

In accordance with some aspects, there are provided laser line generating assemblies for projecting a low-speckle laser line at a projection plane and associated laser line generators.

A laser line may be understood as a one-dimensional or quasi-one dimensional distribution of laser light rays intersecting a projection plane. Laser lines typically have a finite length and a small thickness within the projection plane. For example, in some typical implementations the laser line may have a length between about 50 mm and about 300 mm. It will however be readily understood that in other implementations the laser line may be as short as about 0.1 mm or shorter, or as long as about 5000 mm or longer, without departing from the scope of protection. In addition, in some typical implementations the laser line may for example have a thickness between about 50 µm and about 500 µm. It will however be readily understood that in other implementations the laser line may be as thin as about 5 µm or thinner, or as thick as about 5000 µm or thicker, without departing from the scope of protection. Laser line generating assemblies such as described herein may be used for a variety of applications where an object is to be illuminated by a laser line exhibiting low speckle. Such applications for example include industrial machine vision systems or the like, in which an object is illuminated by a laser line and the deviations of the shape and spatial characteristics of the reflected light from the illuminating pattern are analysed to provide information on the illuminated surface. Other examples of use include projectors, visual alignment applications and visual art applications.

Referring to FIGS. 1, 2 and 2A, there is shown a laser line generating assembly 30 according to one implementation.

The laser line generating assembly 30 generally includes a laser source 32 configured to generate a laser beam 34, and a laser line generator 40. As explained in detail below, the laser line generator 40 includes one or more modules, components and/or devices which collectively transform the laser beam 34 into a low-speckle laser line 31 at a projection plane 38.

FIGS. 1, 2 and 2A use a cartesian coordinate system XYZ with the Z axis corresponding to the light propagation direction of the laser beam 34 and the X axis to the orientation of the low-speckle laser line 31. The XZ plane therefore corresponds to the propagation plane 36 of light throughout the assembly 30, and the XY plane corresponds to the projection plane 38. It will be readily understood that this frame of reference is provided for ease of reference only. It will also be readily understood that in some variants, light may be deflected at various points between the light source 32 and the projection plane 38 such that the propagation direction or plane change.

It will be readily understood that in some implementations, the laser source 32 and laser line generator 40 may be provided as a single system, whereas in other implementations, the laser line generator 40 may be provided independently of the laser source 32. For example, in such a case the laser line generator 40 may include an optical fiber input (not shown) connectable to an optical fiber carrying the laser beam 34, and configured to inject the laser beam 34 into the laser line generator 40. In other variants, the laser beam from the laser source may be optically coupled to the laser line generator in a free space configuration.

The laser source 32 may be based on any type of gain medium such as for example a gas laser, a solid-state laser, a fiber laser, a dye laser or a semiconductor (diode) laser. In some implementations, the laser source is embodied by a laser diode, such as for example a Fabry-Perot (FP) laser diode, a Distributed Feedback (DFB laser diode), a Distributed Bragg Reflector (DBR) laser diode, a Quantum Cascade (QCL) laser diode, Vertical Cavity Surface Emitting Lasers (VCSELs) laser diode, or the like. In some variants, the laser diode may be a spatial multimode laser diode. In other variants, the laser diode may be a singlemode laser diode.

As is known in the art, the light waves making up a laser beam are strongly coherent, that is, there is a fixed phase relationship between their respective electric field values at a same moment in different locations (spatial coherence) and at a same location but at different times (temporal coherence). The temporal coherence of the laser beam 34 is characterized by a coherence length, defined as the propagation distance over which the coherence significantly decays. The coherence length is common parameter used in laser optics and its evaluation or determination, for example measured with a Michelson or Mach-Zehnder interferometer, is well known in the art.

In some implementations, the laser line generator 40 includes a beam divider 42 configured to divide the laser beam 34 into incoherent multiple sub-beams 44a . . . 44n propagating in a same propagation plane 36, and a sub-beam converter 90 generating a plurality of laser light sheets 94a . . . 94n, each laser light sheet 94a . . . 94n being associated with a corresponding one of the sub-beams 44a . . . 44n. Each laser light sheet 94a . . . 94n also extends within the propagation plane 36. As will be explained in detail below, the laser light sheets 94a . . . 94n intersect the projection plane 38 to define laser line elements 96a . . . 96n overlapping at least partially, to form the low-speckle laser line 31. The laser line elements 96a . . . 96n have respective speckle patterns which are at least partially uncorrelated.

Beam Divider

As will be readily understood by one skilled in the art, the temporal coherence between the different sub-beams stemming from a same source laser beam can be broken if the sub-beams follow different light paths which provide different delays between the associated electrical fields. For example, in some implementations such as the one of FIGS. 1 and 2, the beam divider 42 may include a light cavity 46 defined by parallel back and front reflectors 48 and 50. It will be readily understood the in the context of the present description, the designation of "front" and "back" are used by convention only to refer to position with respect to the propagation plane 36, the front reflector 50 being on the side of the propagation plane 36 and the back reflector 48 being on the side of the laser source 32. The light cavity 46 reflects the laser beam 34 for multiple passes, each pass corresponding to light travelling from one reflector to the other and back. Each of these passes generates one of the sub-beams 44, extracted from the light cavity 46 at the front reflector 50. The optical path travelled by the laser beam 34 within each of the multiple passes is longer than the coherence length of the laser beam, such that the sub-beams are not temporally coherent with each other. In some implementations, any coherence length smaller than about 1 or 2 millimeters may be contemplated for this design using typically sized light cavities, for example having a distance between the back reflector and the front reflector between about 2 mm and about 10 mm. In other variants, the size of the beam divider may be adapted to accommodate laser beams having longer coherence lengths. leading to the use of cavity sizes between about 10 mm and about 25 mm. Some multimode diodes inherently have a coherence length of few hundreds of micrometers. Alternatively, the coherence length of a typical diode may be decreased to a few hundred of micrometers by pulsing the laser beam, leading to the use of cavity sizes between about 0.5 mm and about 5 mm.

As will also be readily understood by one skilled in the art, a variety of configurations may be used to embody the beam divider 42. Referring to FIGS. 3A to 3D examples of such configured are shown, for illustrative purposes only.

Referring more particularly to FIG. 3A, in some embodiments the back reflector 48 of the light cavity 46 is a high reflectivity reflector and the front reflector 50 is a partially reflective reflector. This configuration may for example be implemented in a rectangular transparent block 52 made of glass or other suitable material, having back and front surfaces 56 and 58 provided with reflective coating layers 57, 59 thereon each designed according to the desired degree of reflectivity. By way of example, the reflective coating layers 57, 59 may be a metallic (for example an aluminum layer) or dielectric (for example magnesium fluoride (MgF2), multilayers, Bragg mirror) component. A light input 54 receiving the laser beam 34 within the light cavity 46 at an input angle α having a non-zero value with respect to a normal N to the plane of the back reflector 48. In the illustrated embodiment, the light input 54 is for example embodied by a portion of the back surface 56 of the transparent block 52 free of the reflective coating layer 57 otherwise covering the remainder of this back surface 56, the transparent block 52 being positioned with respect to the laser beam 34 according to the incidence angle α. The laser beam 34 may undergo a deviation of its propagation direction due to refraction at the interface between the material of the transparent block 52 and surrounding air when entering the transparent block 52. After having entered the transparent block 52, the laser beam 34 is reflected back-and forth between the back reflector 48 and the front reflector 50. Each time the laser beam 34 reaches the front surface 58 of the transparent block, a portion of the light is transmitted out of the light cavity 46, defining one of the sub-beams 44. The remainder of the laser beam 34 is reflected at a reflection angle β equal to the incidence angle according to the law of reflection.

In some implementations, the front surface reflective coating layer 59 is configured such that all of the sub-beam 44a, . . . 44n contains substantially the same light power. By way of example, this may be achieved by varying the thickness or number of sub-layers of the reflective coating layer 59 along the front surface 58. In some implementations the front surface reflective coating layer 59 may cover the entire front surface 58 of the transparent block 52, while in other variants it may be provided only at the locations where the laser beam 34 impinges of the front surface 58.

Referring to FIG. 3B, there is shown another example of implementation of the beam divider 42. In the illustrated variant, the beam divider 42 again includes a light cavity 46 formed by a transparent block 52 having a back surface 56 provided with a high reflectivity reflective coating layer 57. However, in this embodiment, the light input 54 includes an input diffractive coupler 60 receiving the laser beam 34 according to an input angle normal to the back surface 56 of the transparent block 52, that is, the transparent block 52 is positioned with the back surface 56 perpendicular to the propagation direction of the laser beam 34. The input diffractive coupler 60 is preferably embodied by a diffraction grating which diffracts the laser beam 34 into a non-zero diffraction order. The diffraction grating may be engraved in the transparent block 52 or photoinduced in photoresist, or embodied by a metasurface deposited on the back surface 56 of the transparent block 52. For example, the diffraction grating may be configured to minimize light transmission in the zeroth-order and maximize light transmission in the ±1 order. The beam divider 42 according to the illustrated embodiment of FIG. 3B further includes and a plurality of output diffractive couplers 62 positioned along the front surface 59 of the transparent block 56 to output portions of the laser beam 34 as the sub-beams 44. The output diffractive couplers 62 may for example also be embodied by diffraction gratings engraved or photoinduced or by metasurfaces deposited on the front surface 58 of the transparent block 52. The output diffractive couplers 62 are preferably configured such that each sub-beam 44 contains substantially the same light power.

Figure 3D:
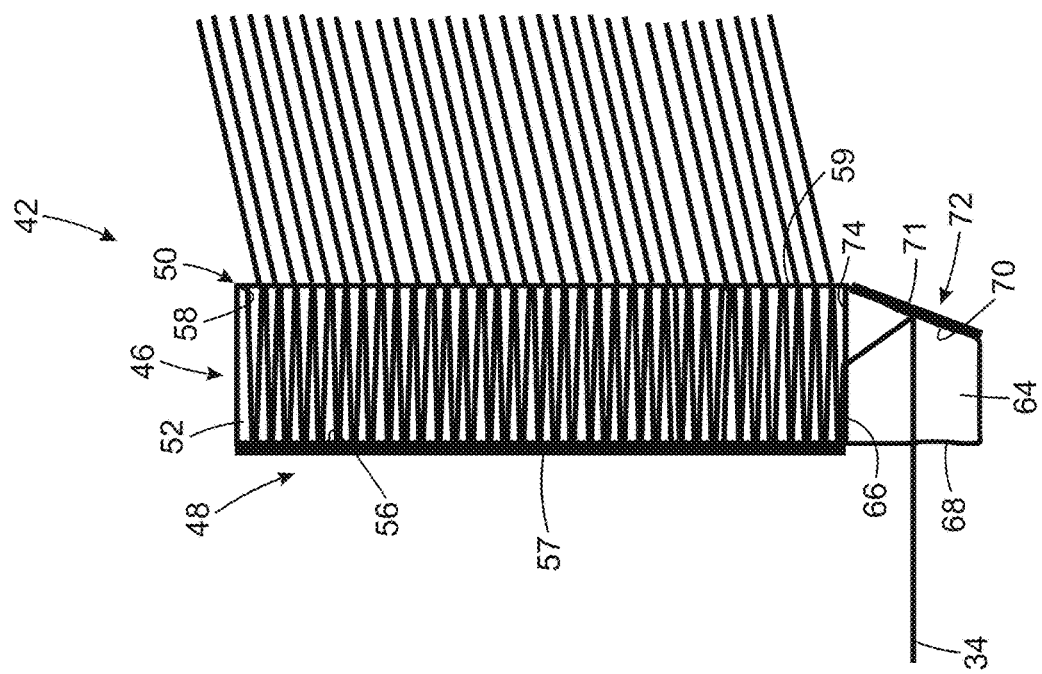
Figure 3C:
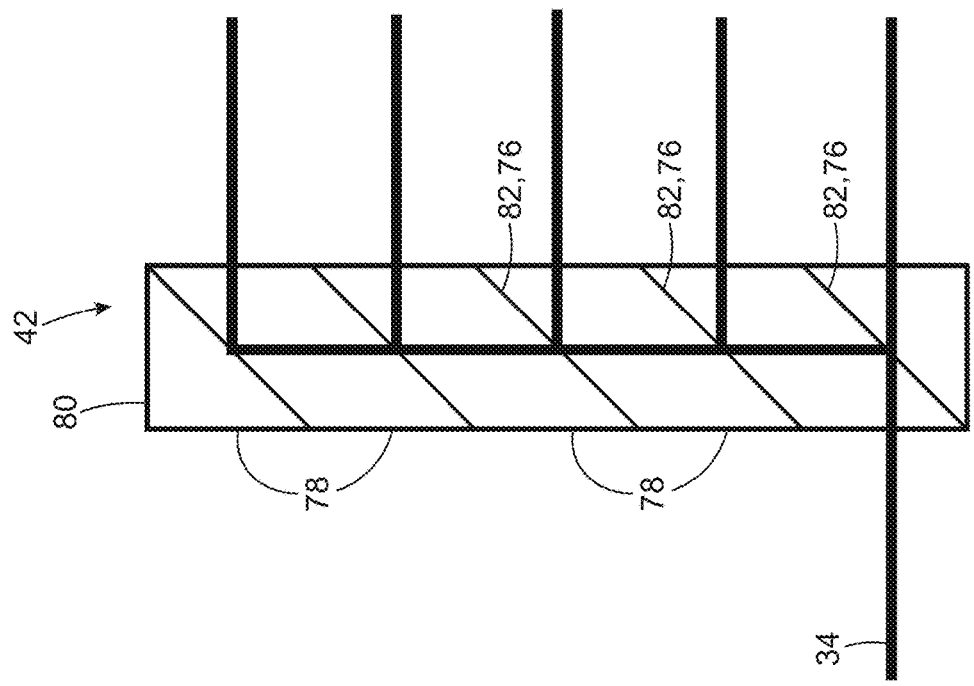

Referring to FIG. 3C, there is shown another example of beam divider 42 according to another embodiment. In this variant, instead of using a light cavity, the beam divider 42 divides the laser beam 34 through a plurality of partially reflective mirrors 76 positioned sequentially in the path of the laser beam 34 and making a 45° angle with respect to the propagation direction of the laser beam 34. The beam divider 42 is positioned such that the laser beam 34 enters at normal incidence. In the illustrated variant, the beam divider may be formed of a plurality of trapezoidal glass pieces 78 assembled to form a rectangular block 80, a layer of semi-reflective material 82 extending at the interfaces between consecutive pieces 78. Of course, other geometries could be used to achieve the same result.

Referring to FIG. 3D, there is shown yet another example of a beam divider 42 according to an embodiment. In this variant, the beam divider includes two blocks made of different glass materials: a transparent block 52 acting as the light cavity 46, and an input block 64 having a side surface 66 contiguous with a side surface 74 of the transparent block 52. The transparent block 52 is made of a low reflective index material, such as for example fused silica or other optical glass materials, such as for example N-bk7, N-SF2. The transparent block 52 has a back surface 56 provided with a back surface highly reflective coating layer 57, forming a high reflectivity back reflector 48, and a parallel front surface 58 provided with a partially reflective front surface coating layer 59 designed with a gradually increasing light transmission profile, forming a partial reflectivity front reflector 50. The input block 64 is made of a high reflective index material, such as for example N-SF6, or N-SF5. In the illustrated variant, the beam divider is positioned such that the laser beam 34 enters the input block 64 through a back surface 68 thereof at normal incidence and travels frontwards through the input block 64 towards an angled front surface 70 provided with a reflective coating 71, therefore acting as a mirror 72. The laser beam 34 is then reflected towards the common interface between the contiguous sides surfaces 66 and 74 of the input block 64 and the transparent block 52. The refractive index difference between the materials of the transparent block 52 and the input block 64 and the angle at which the laser beam 34 impinges on the side surface 66 of the input block are such that the laser beam 34 enters the transparent block 52 at an angle near the critical angle where total internal reflection starts. This leads to the laser beam 34 entering the transparent block 52 at a very small angle with respect to its side surface 74, and consequently, to impinge on the front and back reflectors 48, 50 at an angle close to normal incidence. Such a configuration provides for a large number of passes of the laser beam 34 in the light cavity, and therefore generates a large number of sub-beams 44.

Sub-Beam Converter

Referring back to FIGS. 1 and 2, as mentioned above the laser line generator 40 further include a sub-beam converter 90 generating a plurality of laser light sheets 94a, 94b, . . . 94n.

The expression "light sheet" may be understood as light waves co-propagating in a plane, either in parallel, gradually diverging or gradually converging, such that a transverse section of the light sheet forms a line. Preferably, the light sheets 94 have a diffraction limited thickness transversally to the propagation plane 36. The laser light sheets 94a, 94b, . . . 94n intersect the projection plane 38 to define laser line elements 96a, 96b, . . . 96n overlapping at least partially to form the low-speckle laser line 31. The laser line elements 96a, 96b, . . . 96n have respective speckle patterns at least partially uncorrelated.

Referring more specifically to FIG. 2 and with further reference to FIG. 2A, the beam divider 42 and the sub-beam converter 90 are jointly configured to produce the multiple light sheets 94. Each light sheet 94 is incoherent with respect to the other light sheets 94, and as a result, their respective intensity is simply added at the projection plane 38 in the region along which they overlap, without the intensity modulation caused by the interference effect. Moreover, since each individual lightsheet 94 is coherent, it will produce a speckle pattern at the image plane of an observer. If multiple light sheets 94 illuminate a point P on the projection plane 38 with a different angle of incidence $\theta 1$, $\theta 2$, as shown in FIG. 2A, the resulting speckle patterns at the image place of the observer 39 will be uncorrelated from light sheet to light sheet. The incoherent summation of uncorrelated speckle patterns will result in a speckle pattern with a lower contrast. In one realisation, the minimum angle of incidence difference $\Delta\theta$ between two rays R1, R2 from two light sheets 94a, 94b at the same point P at the projection plane 38 is preferably about 1 degree or a bit more or less to uncorrelate their respective speckle pattern. A smaller angle may still decrease speckle contrast to an acceptable level. The angular difference is a function of the respective geometry of the observation instrument at the observer 39, the laser source 32 and the projection plane 38.

By way of example, in some implementations, the sub-beam converter 90 converts each sub-beam 44a, 44b, . . . 44n into a point source 92a, 92b, . . . 92n. Each point source 92a, 92b, . . . 92n generates a corresponding one of the laser light sheets 94a, 94b, . . . 94n. The point sources 92a, 92b, . . . 92n from the multiple sub-beams 44a, 44b, . . . 44n are mutually separated to obtain the desired uncorrelated speckle patterns. It will be readily understood by one skilled in the art that the sub-beam converter 90 may include or be composed of a variety of optical components or combination of optical components apt to convert the sub-beams 44 into laser light sheets 94, that is to induce a divergence in the light rays making up each sub-beam. As will be explained below though various examples, this may be accomplished using diffraction gratings, lenses and the like.

Figure 4:
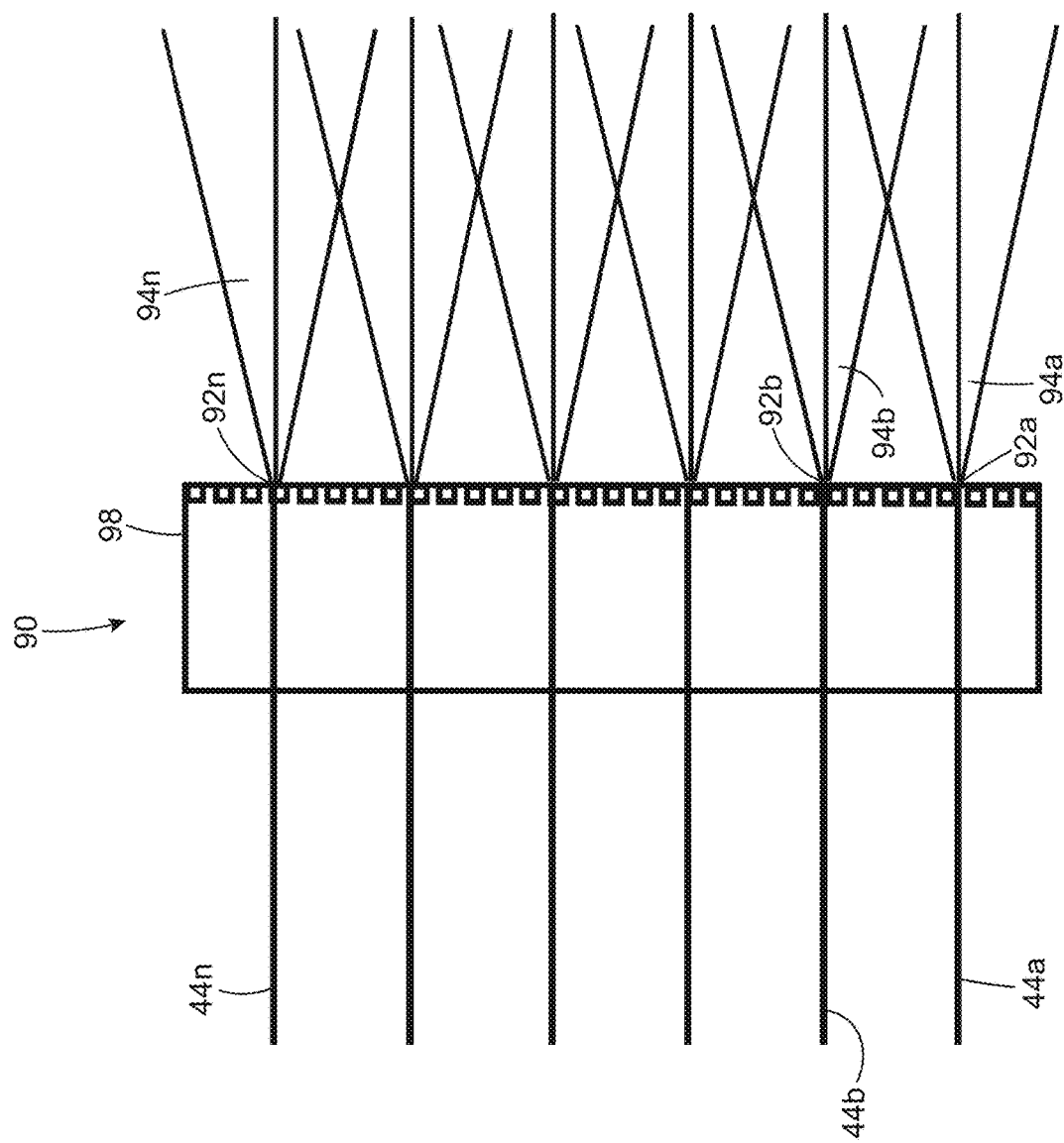
FIG. 4 schematically illustrates a diffraction grating used in a sub-beam converter according to one embodiment.
Figure 5A:
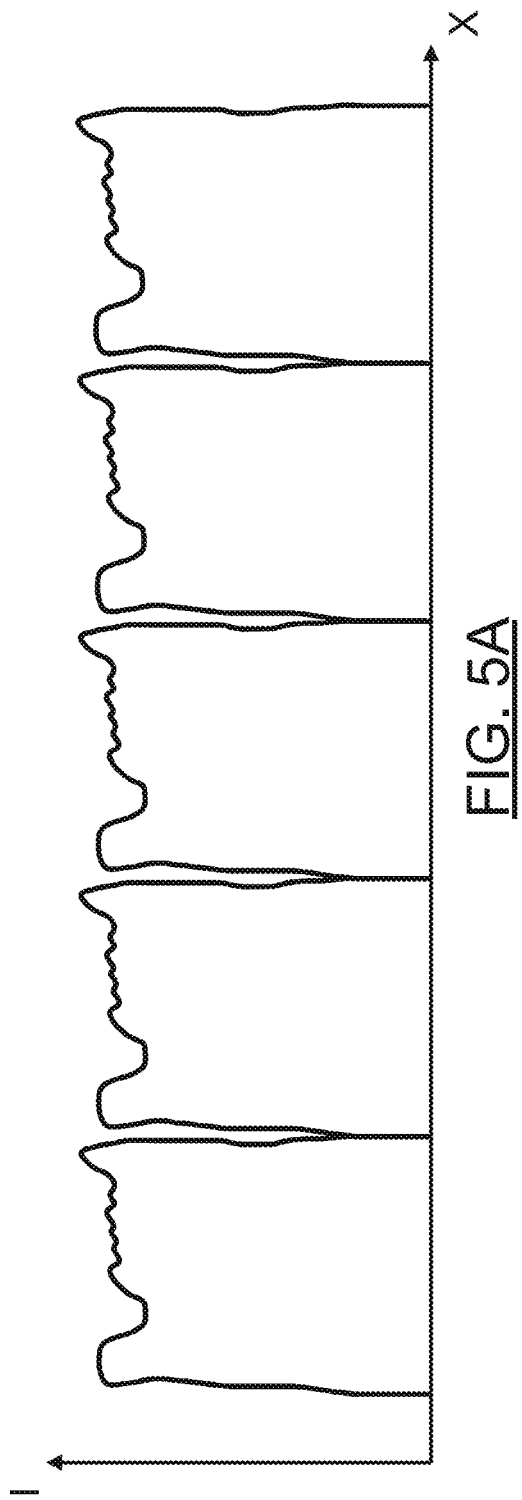
FIG. 5A is a graphical representation of a line sheet formed by the combination of images of a sub-beam having a fanned-out shape diffracted by a diffraction grating; 5B is a graphical representation of the intensity profile of the superposition of light patterns from uncoherent line sheets to form a line of uniform intensity.
Figure 5B:
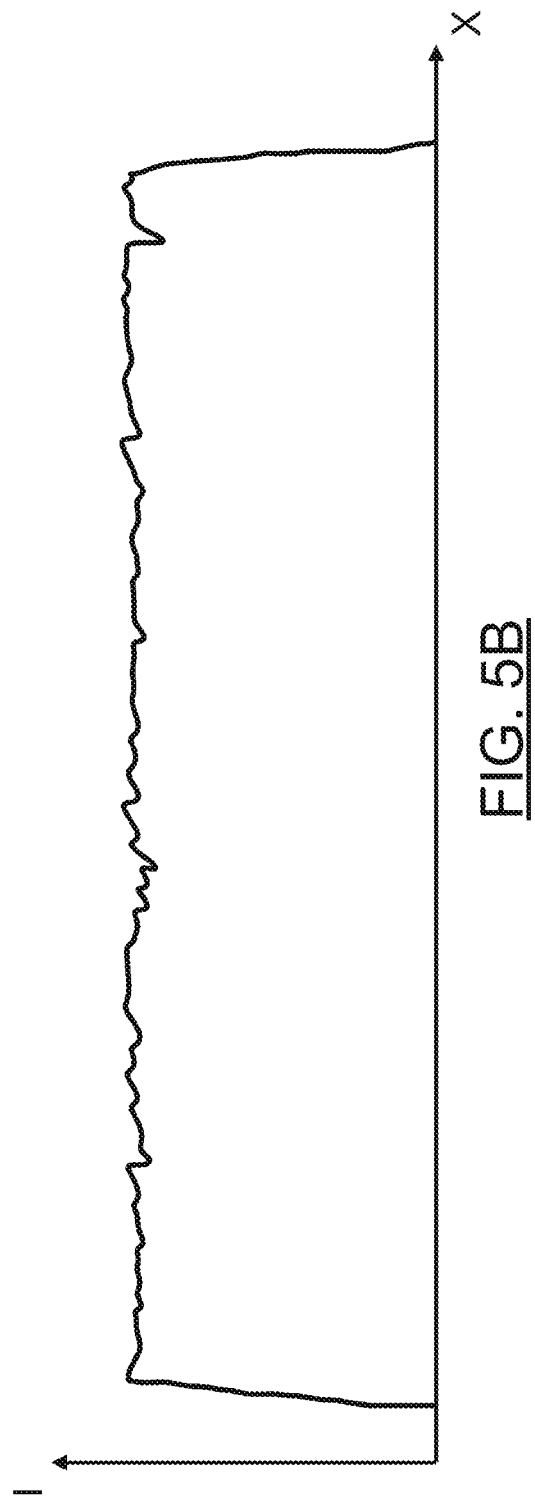

Referring to FIG. 4, In some implementations, the sub-beam converter 90 may be embodied by or include a bulk diffraction grating 98 which may be designed for use in transmission or reflection. The diffraction grating 98 may for example be a holographic pattern engraved or photoinduced into a planar glass substrate, or a plurality of metasurfaces deposited on a surface of a planar glass substrate. It will be readily understood that the bulk diffraction grating may alternatively be embodied by any diffractive component or assembly of components diffracting the sub-beams into multiple diffraction orders. Each sub-beam 44 hits the diffraction grating 98 at a different spot and creates a corresponding laser light sheet 94. The use of a diffraction grating allows to keep the line thickness near diffraction limited in the propagation plane 36. As well known in the art, the grating has parameters such as a grating period and depth which provide images of each sub-beam 44 into multiple diffraction orders depending on the light wavelength. Referring to FIG. 5A, in one example, there is shown an example of the intensity profile I of a line element generated from one of the point sources at the projection plane. The diffraction grating generates a similar light pattern from each point source, these light patterns superposing at the projection plane to form the low-speckle line. As can be seen in FIG. 5B, since the point sources are mutually incoherent, their individual light patterns average out to obtain a line of uniform intensity. As will be readily understood by one skilled in the art, other parameters of the laser line generators such as the size, shape and distance between different optical components are selected to provide a uniform illumination of another desired light intensity distribution over the length of the line.

Figure 6A:
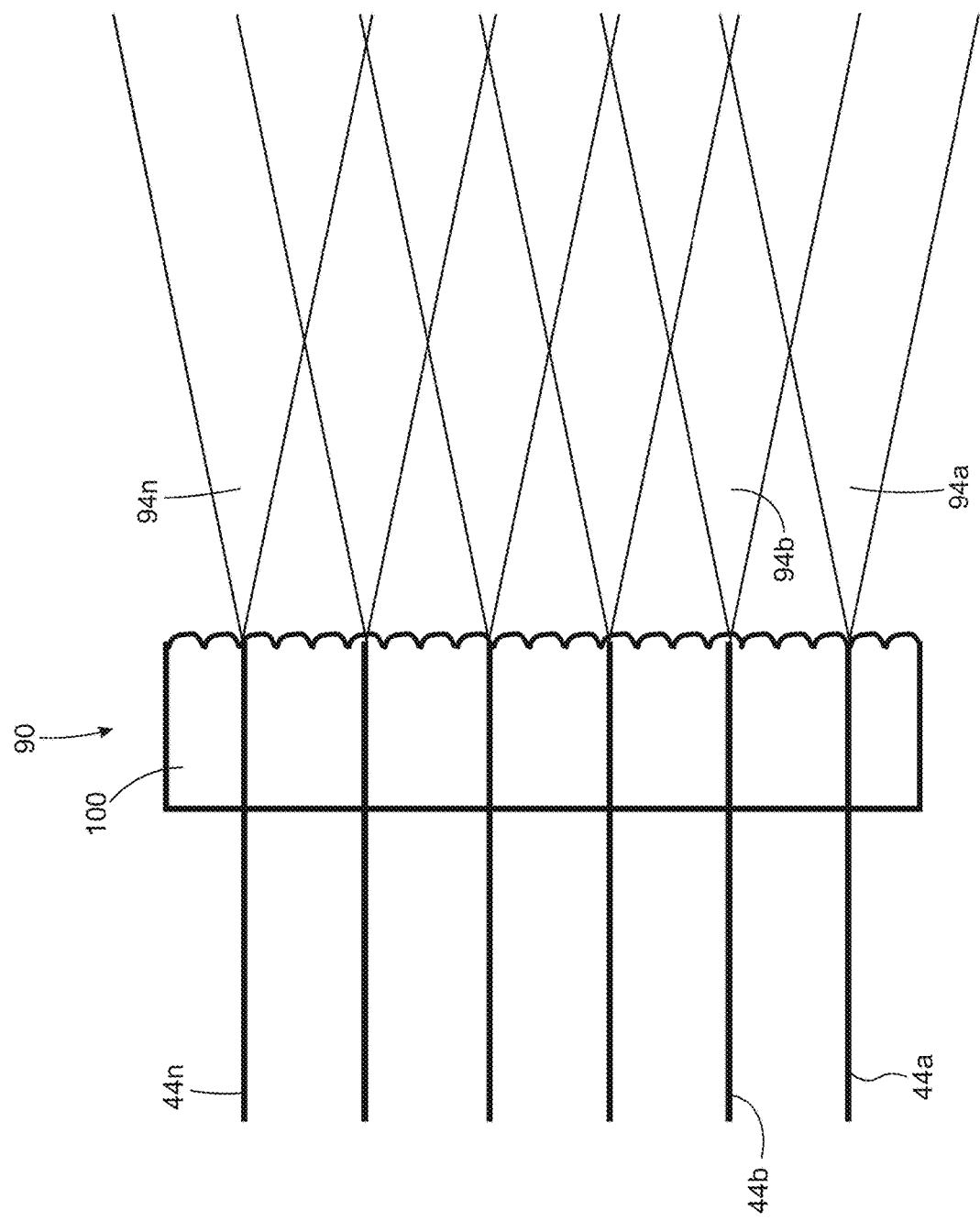
FIGS. 6A and 6B schematically illustrate the use of a linear diffuser and a cylindrical lens in a sub-beam converter, respectively.

Referring to FIG. 6A, in another example, the sub-beam converter 90 may be embodied by or include a linear diffuser 100. The linear diffuser 100 may for example be refractive micro lenses or diffractive diffuser. One skilled in the art would understand that unlike a diffraction grating, a diffuser spreads the light in each sub-beam in a random fashion. Each sub-beam 44 hits the diffuser 100 at a different spot and the light intensity therein is randomly spread out within the propagation plane so as to creates a corresponding laser light sheet 94.

Figure 6B:
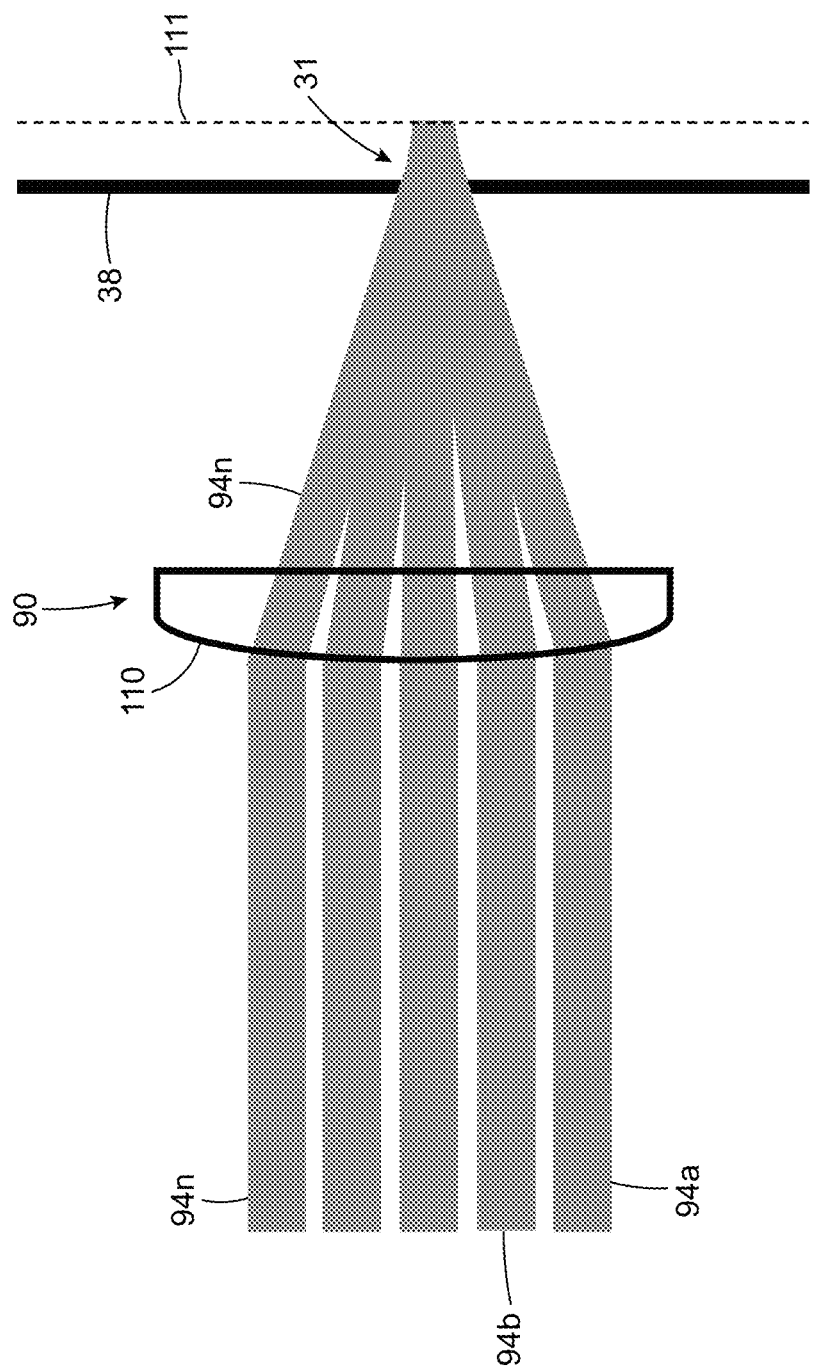

Referring to FIG. 6B in another variant the sub-beam converter 90 may include a cylindrical lens 110. In this realisation, all the sub-beams 44 from the beam divider 42 are already spread into light sheets 94a, 94b, . . . , 94n (for example using one or more line-generating lens, as explained further below), which are converged into a focal plane 111 by the cylindrical lens 110. The relative position of the projection plane 38 with respect to the focal plane 111 of the cylindrical lens 110 determines the size of the resulting laser line 31, and the resulting defocussing of the light sheets averages the intensity profile of each sub-beam to result in a more uniform illumination laser line. If the focal plane 111 of the cylindrical lens 110 is located exactly on the projection plane 38, all the sub-beams 44a, 44b, . . . 44n will overlap with each other. However, if the projection plane 38 is slightly offset compared to the focal plane 111 of the cylindrical lens 110, then there will be a small shift between each sub-beam 44, which can be beneficial or not depending on the intensity profile of the laser source 32.

Figure 7:
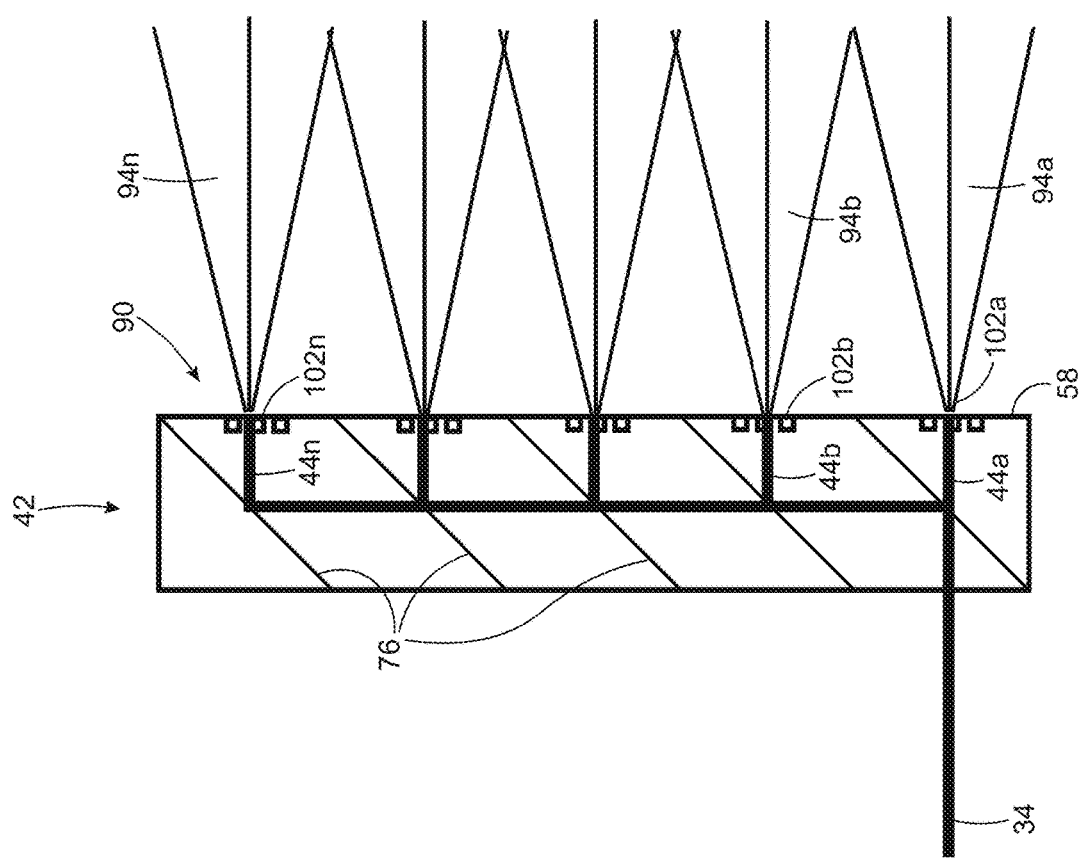
FIG. 7 schematically illustrate an embodiment in which the beam divider and the sub-beam converter are integrated in a single monolithic component.

Although the beam divider 42 and the sub-beam converter 90 have been described in the examples above as physically separate components, in some variants they may both be integrated in a single monolithic component. By way of example, FIG. 7 shows a variant wherein the beam divider 42 has a configuration similar to that of FIG. 3C, where a plurality of partially reflective mirrors 76 are positioned sequentially in the path of the laser beam 34 and making a 45° angle with respect to the propagation direction of the laser beam 34. The beam divider 42 is positioned such that the laser beam 34 enters at normal incidence. The sub-beam converter 90 is embodied by a series of integrated diffraction gratings 102a, 102b, . . . 102n provided on the front surface 58 of the beam divider 42 in the path of each sub beam 44. The integrated diffraction gratings 102 generate the light sheets 94 directly from the front surface 58 of the beam divider 42.

Figure 8:
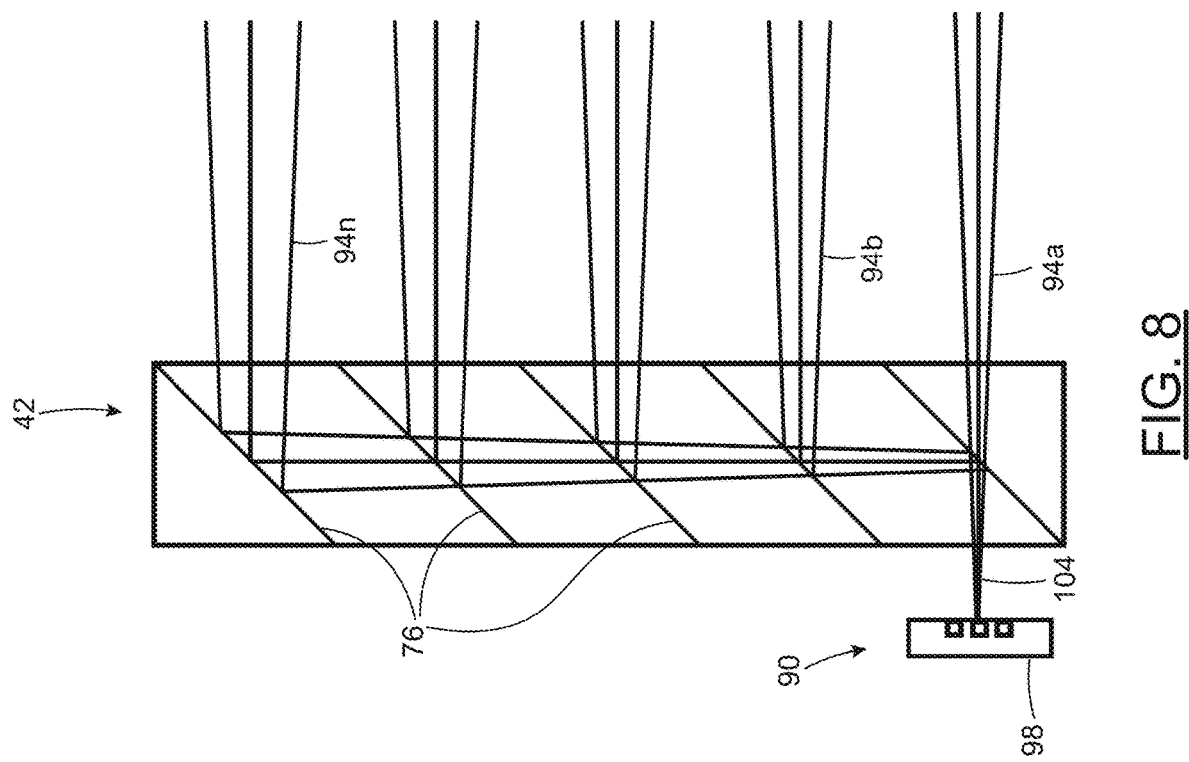
FIG. 8 schematically illustrate a configuration in which the sub-beam converter is positioned upstream of the beam divider.

Referring to FIG. 8, there is shown an alternative embodiment in which the sub-beam converter 90 is positioned upstream of the beam divider 42. The sub-beam converter may for example be a bulk diffraction grating 98 positioned aligned with the light input 54 of the beam divider 42. The beam divider shown in this illustrated embodiment is made of a plurality of partially reflective mirrors 76 such as explained with respect to FIG. 3C. The diffraction grating 98 created a seed light sheet 104 which is partially transmitted and partially reflected at each partially reflective mirror 76. As a result, multiple laser light sheets 94 are outputted directly by the beam divider 42. In effect, in this variant the sub-beam converter 90 provides a pre-conversion of the sub-beams into laser light sheets.

It will be readily understood that the laser line generating assembly 30 may include one or more additional components or assemblies directing, focussing, shaping, filtering or otherwise acting on light.

Examples of Configurations of the Laser Line Generating Assembly

By way of example only and in a non-limitative fashion, different optical configurations for the laser line generating assembly 30 are described below.

Figure 9:
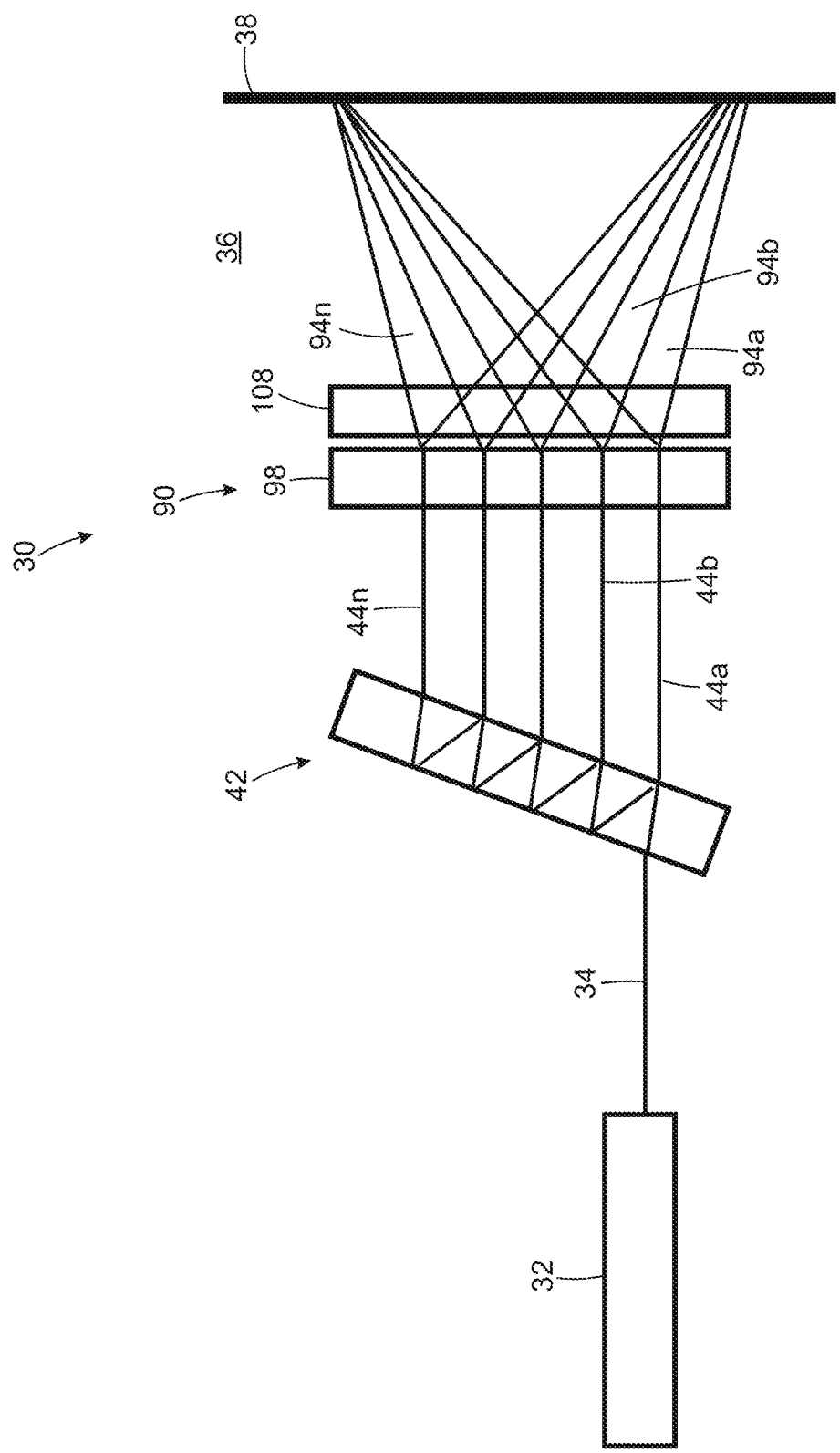
FIG. 9 schematically illustrate a configuration in which the sub-beam converter includes a diffraction grating and a cylindrical lens as a beam conditioning block.

Referring to FIG. 9, shows a configuration of a laser line generating assembly 30 for projecting a low-speckle laser line at a projection plane 38, according to one embodiment. The illustrated laser line generating assembly 30 includes a laser source 32 generating a laser beam 34 having a temporal coherence characterized by a coherence length. The laser source 32 may for example be embodied by a gas laser, a solid-state laser, a fiber laser, a dye laser or a semiconductor (diode) laser. In some implementations, the laser source is embodied by a laser diode, such as for example a Fabry-Perot (FP) laser diode, a Distributed Feedback (DFB laser diode), a Distributed Bragg Reflector (DBR) laser diode, a Quantum Cascade (QCL) laser diode, Vertical Cavity Surface Emitting Lasers (VCSELs) laser diode, or the like. In some implementations, the configuration of FIG. 9 may be adapted for use with a singlemode laser diode as the laser source 32, although a multimode laser diode may also be used.

Still referring to FIG. 9, the illustrated laser line generating assembly 30 further includes a beam divider 42. The beam divider may for example correspond to any one of the variants illustrated in FIGS. 3A to 3D or equivalents thereof. The laser line generating assembly 30 of FIG. 9 further includes a sub-beam converter 90 generating a plurality of laser light sheets 94a, 94b . . . 94n. The sub-beam converter 90 may for example be embodied by to any one of the variants described above. In one example, the sub-beam converter 90 may be a bulk diffraction grating, such as for example a holographic pattern engraved or photoinduced into a planar glass substrate or a plurality of metasurfaces deposited on a surface of a planar glass substrate. Each laser light sheet 94a, 94b . . . 94n extends within the propagation plane 36. The laser light sheets 94a, 94b . . . 94n intersects the projection plane 38 to define laser line elements 96, 96b, . . . 96n overlapping at least partially to form the low-speckle laser line 31, the laser line elements 96, 96b, . . . 96n having respective speckle patterns which are at least partially uncorrelated.

The illustrated laser line generating assembly 30 of FIG. 9 further includes a beam conditioning block 108 positioned downstream the sub-beam converter 90. The beam conditioning block 108 may be embodied by any optical component having a desired impact on the laser light sheets 94. In one example, the beam conditioning block 108 may be embodied by a cylindrical lens 110 positioned downstream the bulk diffraction grating 98 to focus the light in the propagation plane 36 at the projection plane 38. FIGS. 10A and 10B are side view of laser line generating assemblies without and with such a cylindrical lens, showing the differences in light paths. In some variants, the beam conditioning block 108 mat be embodied by one or more cylindrical lenses, acylindrical lenses, spherical lenses, aspherical lenses, or combinations thereof.

Figure 11A:
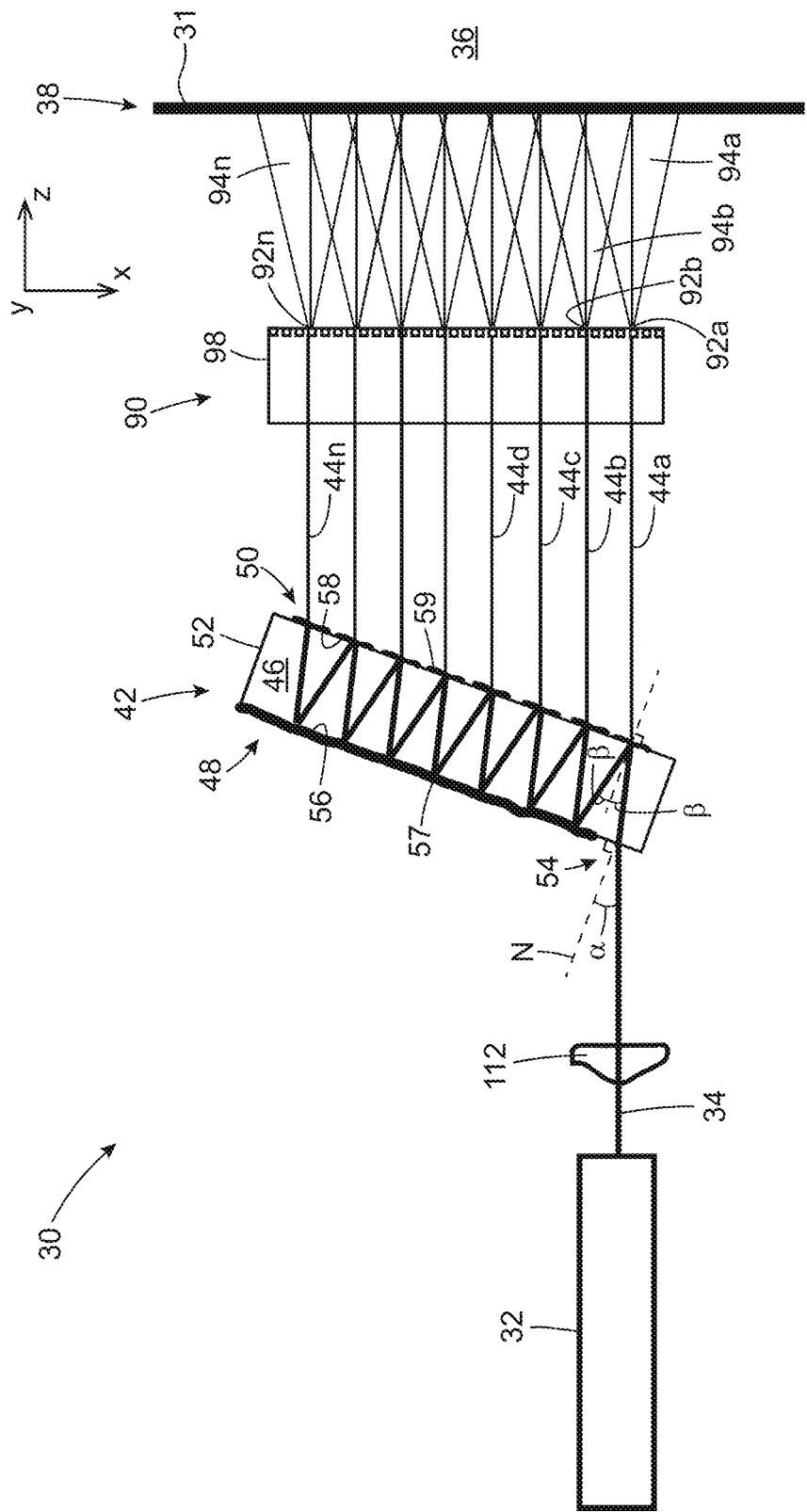
FIG. 11A schematically illustrate a configuration including a line-generating lens between the laser source and the beam divider.

FIG. 11A shows a configuration of a laser line generating assembly 30 for projecting a low-speckle laser line at a projection plane 38, according to one embodiment. The illustrated laser line generating assembly 30 includes a laser source 32 generating a laser beam 34 having a temporal coherence characterized by a coherence length. The laser source 32 may for example be embodied by a gas laser, a solid-state laser, a fiber laser, a dye laser or a semiconductor (diode) laser. In some implementations, the laser source is embodied by a laser diode, such as for example a Fabry-Perot (FP) laser diode, a Distributed Feedback (DFB laser diode), a Distributed Bragg Reflector (DBR) laser diode, a Quantum Cascade (QCL) laser diode, Vertical Cavity Surface Emitting Lasers (VCSELs) laser diode, or the like. In some implementations, the configuration of FIG. 11A may be adapted for use with a singlemode laser diode as the laser source 32, although a multimode laser diode may also be used.

Still referring to FIG. 11A, the illustrated laser line generating assembly 30 further includes a high reflectivity reflector or back reflector 48, and a partially reflective reflector or front reflector 50, extending in parallel and defining a light cavity 46 therebetween. By way of example, the light cavity 46 may include a rectangular transparent block 52, and the high reflectivity reflector 48 and the partially reflective reflector 50 may be defined by reflective coating layers 57, 59 provided along respective back and front surfaces 56, 58 of the rectangular transparent block 52. The reflective coating layers 57, 59 may be a metallic or dielectric component, as mentioned above. The reflective coating layer 59 defining the partially reflective reflector 50 may have a varying thickness along the front surface 58 of the rectangular transparent block 56. The light cavity 46 has a light input 54 configured to receive the laser beam 34 so that the laser beam 34 is reflected within the light cavity 46 for multiple passes. The light input 54 may be positioned to receive the laser beam 34 within the light cavity 46 at an input angle α having a non-zero value with respect to a normal N to a plane of the high reflectivity reflector 48. In some embodiments, the light input may consist of a portion of the back surface 56 of the rectangular transparent block 52 free of the reflective coating layer 57 defining the high reflectivity reflector 48. The laser beam 34 has an optical path within each of the multiple passes longer than the coherence length, as explained above. Each pass generates one of multiple incoherent sub-beams 44a, 44b, . . . 44n propagating in a same propagation plane 36. In some variants, the reflective coating layer 59 defining the partially reflective reflector 50 is configured such that all of the sub-beams 44a, 44b, . . . 44n substantially contain a same light power. It will be readily understood by one skilled in the art that in other variants, a beam divider such as described in either ones of FIGS. 3A to 3D may be used in the configuration of FIG. 11A.

The illustrated laser line generating assembly 30 of FIG. 11A further includes a line-generating lens 112 disposed in a path of the laser beam 34 between the laser source 32 and the light cavity 46. The line-generating lens is designed to fan out the laser beam 34 in one direction within the propagation plane (the x direction in the reference frame of FIG. 11A). Consequently, each of the multiple sub-beams 44a, 44b, . . . 44n outputted by the light cavity 46 have a fanned-out shape within the propagation plane. In some implementations, the line-generating lens 112 may be embodied by an acylindrical lens 112 having a suitable optical design to generate a uniform or pseudo-uniform line. By way of example, a linear deiverging lens such as shown in U.S. Pat. No. 4,826,299 (POWELL), the entire contents of which being incorporated herein be reference. May be used. Such a lens is sometimes referred to in the art and in the present description as a "Powell lens". The line-generating lens 112 may advantageously increase the size of the apparent emitter of the laser source.

Finally, the laser line generating assembly 30 of FIG. 11A includes a bulk diffraction grating 98 positioned across the propagation plane so as to intersect the multiple sub-beams, 44a, 44b, . . . 44n. The bulk diffraction grating 98 diffracts each sub-beam 44a, 44b, . . . 44n into a plurality of diffraction orders spread across the same direction as the fanned-out shape of the sub-beams, that is, the x direction in the referential frame of FIG. 11. The bulk diffraction grating 98 therefore diffracts each sub-beam into a plurality of images of itself, such as shown in FIG. 5A. The plurality of images of each sub-beam 44a, 44b, . . . 44n forms a corresponding laser light sheet 94a, 94b . . . 94n. In other words, the bulk diffraction grating converts each sub-beam 44a, 44b, . . . 44n into a point-source 92a, 92b, . . . 92n generating a corresponding laser light sheet 94a, 94b . . . 94n. The diffraction grating 98 may for example be a holographic pattern engraved or photoinduced into a planar glass substrate or a plurality of metasurfaces deposited on a surface of a planar glass substrate. Each laser light sheet 94a, 94b . . . 94n extends within the propagation plane 36. The laser light sheets 94a, 94b . . . 94n intersects the projection plane 38 to define laser line elements 96, 96b, . . . 96n overlapping at least partially to form the low-speckle laser line 31, the laser line elements 96, 96b, . . . 96n having respective speckle patterns which are at least partially uncorrelated.

Figure 11B:
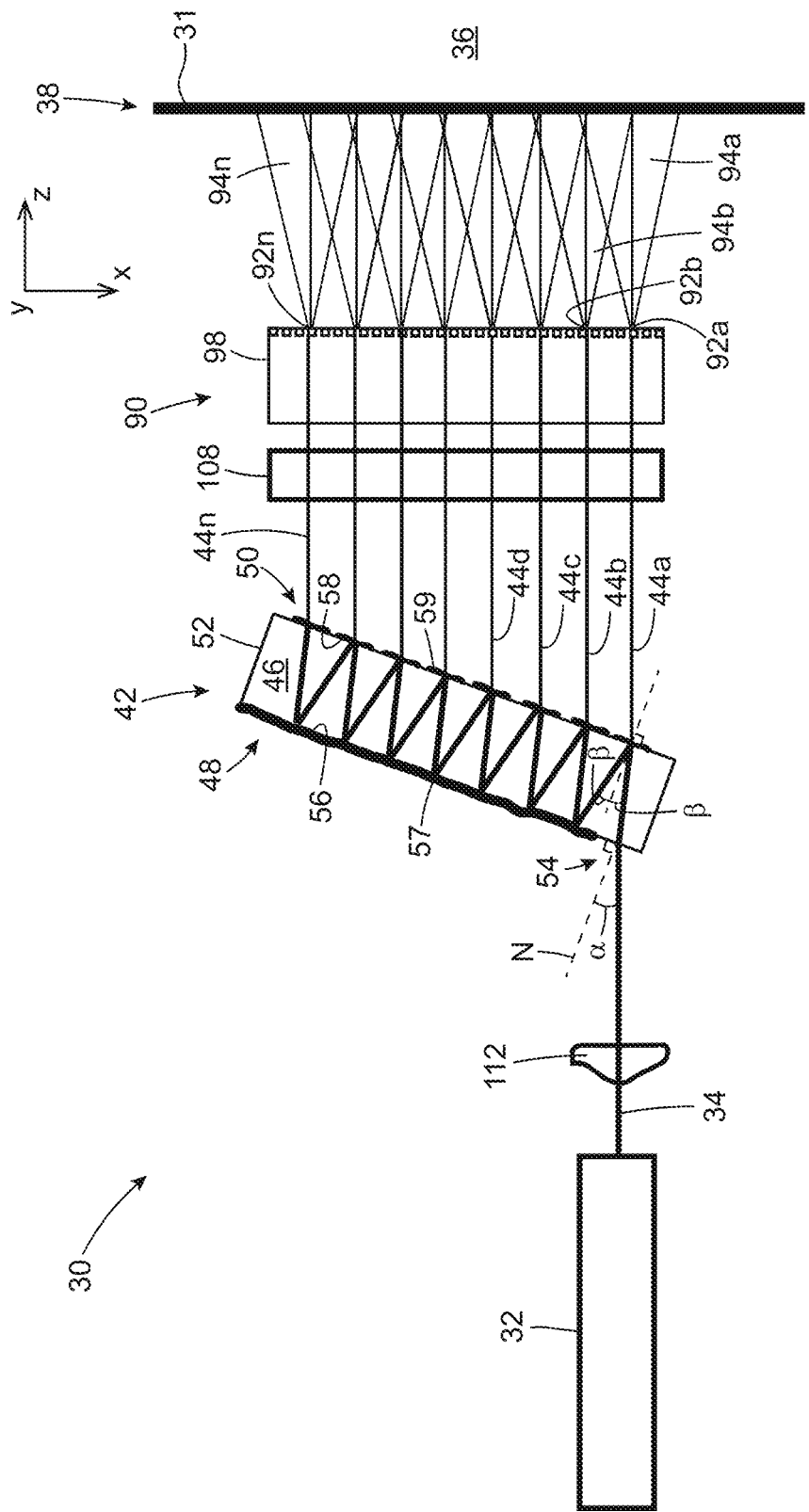
FIG. 11B schematically illustrate a configuration similar to that of FIG. 11A including a beam conditioning block between the sub-beam converter and the bulk diffraction grating.

Referring to FIG. 11B, there is shown a configuration of a laser line generating assembly 30 having all the same features of the configuration of FIG. 11A, with the addition of a beam conditioning block 108 positioned before or after the bulk diffraction grating 98. In some implementations, the beam conditioning block 108 may include a cylindrical or acylindrical lens designed and positioned to focus the laser light sheets 94a, 94b . . . 94n to create a thin line on the projection plane 38. In other implementations, the beam conditioning block 108 may be a spherical or aspherical lens used to focus the line on the projection plane 38 so as to correct the natural curvature of the best focus position to be on a plane. This variant could provide the thinnest line possible all along the generated line on the projection plane 38.

Figure 11C:
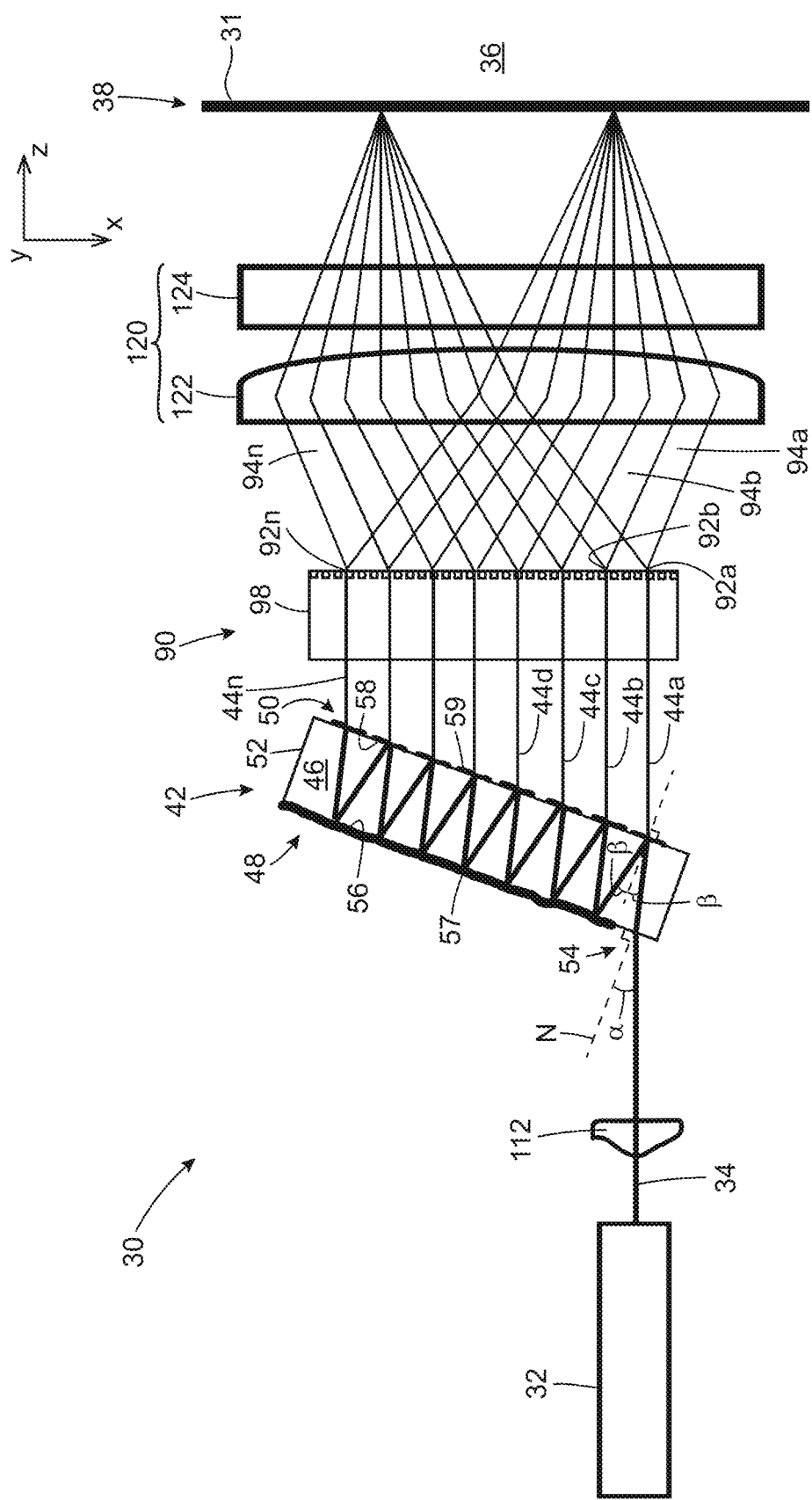
FIG. 11C schematically illustrate a configuration including a pseudo-telecentric illumination module.

Referring to FIG. 11C, there is shown a configuration of a laser line generating assembly 30 having all the same features of the configuration of FIG. 11A, comprising a pseudo-telecentric illumination module 120 provided between the bulk diffraction grating 98 and the projection plane 38. The expression "telecentric" would be understood by one skilled in the art to apply to an optical element having a constant, non angular field of view. In the illustrated embodiment of FIG. 11C, the pseudo-illumination module 120 includes a pair of cylindrical or acylindrical lenses 122 and 124. The first lens 122 has its curvature in the xz plane to redirect the laser light sheets 94a, 94b . . . 94n exiting the bulk diffraction grating 98 into pseudo-parallel light sheets. The second lens 124 has its curvature in the yz plane to focus the laser light sheets 94a, 94b . . . 94n to form a thin line on the projection plane 38. The second lens 124 is positioned at one focal length (1$f$) with respect to the diffraction grating 98.

Figure 12:
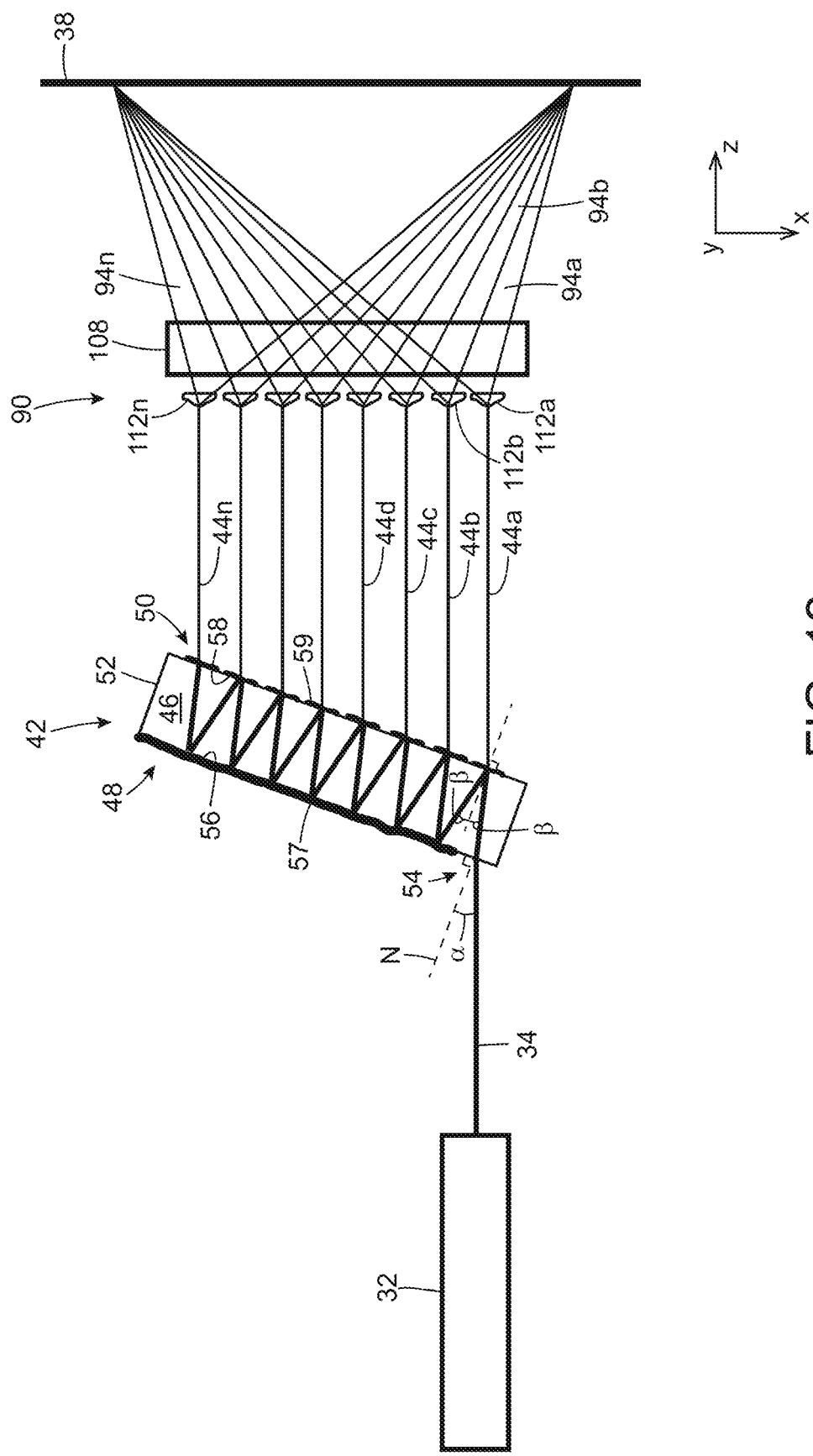
FIG. 12 schematically illustrate a configuration including a series of line-generating lenses.

FIG. 12 shows a configuration of a laser line generating assembly 30 for projecting a low-speckle laser line at a projection plane 38, according to another embodiment. The illustrated laser line generating assembly 30 includes a laser source 32 generating a laser beam 34 having a temporal coherence characterized by a coherence length. The laser source 32 may for example be embodied by a gas laser, a solid-state laser, a fiber laser, a dye laser or a semiconductor (diode) laser. In some implementations, the laser source is embodied by a laser diode, such as for example a Fabry-Perot (FP) laser diode, a Distributed Feedback (DFB laser diode), a Distributed Bragg Reflector (DBR) laser diode, a Quantum Cascade (QCL) laser diode, Vertical Cavity Surface Emitting Lasers (VCSELs) laser diode, or the like. In some implementations, the configuration of FIG. 12 may be adapted for use with a singlemode laser diode as the laser source 32, although a multimode laser diode may also be used.

The laser line generating assembly 30 according to the embodiment of FIG. 12 may include a beam divider such as for example shown in any one of FIGS. 3A to 3D or equivalents thereof. In the illustrated example of FIG. 12, the laser line generating assembly 30 includes a high reflectivity reflector or back reflector 48, and a partially reflective reflector or front reflector 50, extending in parallel and defining a light cavity 46 therebetween. By way of example, the light cavity 46 may include a rectangular transparent block 52, and the high reflectivity reflector 48 and the partially reflective reflector 50 may be defined by reflective coating layers 57, 59 provided along respective back and front surfaces 56, 58 of the rectangular transparent block 52. The reflective coating layers 57, 59 may be a metallic or dielectric component, as mentioned above. The reflective coating layer 59 defining the partially reflective reflector 50 may have a varying thickness along the front surface 58 of the rectangular transparent block 56. The light cavity 46 has a light input 54 configured to receive the laser beam 34 downstream from the line-generating lens 112, so that the laser beam 34 is reflected within the light cavity 46 for multiple passes. The light input 54 may be positioned to receive the laser beam 34 within the light cavity 46 at an input angle α having a non-zero value with respect to a normal N to a plane of the high reflectivity reflector 48. In some embodiments, the light input may consist of a portion of the back surface 56 of the rectangular transparent block 52 free of the reflective coating layer 57 defining the high reflectivity reflector 48. The laser beam 34 has an optical path within each of the multiple passes longer than the coherence length, as explained above. Each passe generates one of multiple incoherent sub-beams 44a, 44b, . . . 44n propagating in a same propagation plane 36. In some variants, the reflective coating layer 59 defining the partially reflective reflector 50 is configured such that all of the sub-beams 44a, 44b, . . . 44n substantially contain a same light power.

Still Referring to FIG. 12, the illustrated laser line generating assembly 30 includes a sub-beam converter 90 embodied by a series of line-generating lenses 112a, 112b, . . . 112n positioned in the paths of the sub-beams 44a, 44b, . . . 44n and followed by a cylindrical lens 108 as the beam conditioning block. The line-generating lenses 112 generate the respective laser light sheets which are focussed transversally to the propagation plane by the cylindrical lens 108. Each light generating lens 112 is designed to fan out the corresponding one of the sub-beams 44a, 44b, . . . 44n in one direction (the x direction in the reference frame of FIG. 12). In some implementations, the line-generating lens 112 may be embodied by a uniform or pseudo-uniform line-acylindrical lens 112 having a suitable optical design. So-called Powell lenses as defined above may be used.

Figure 13A:
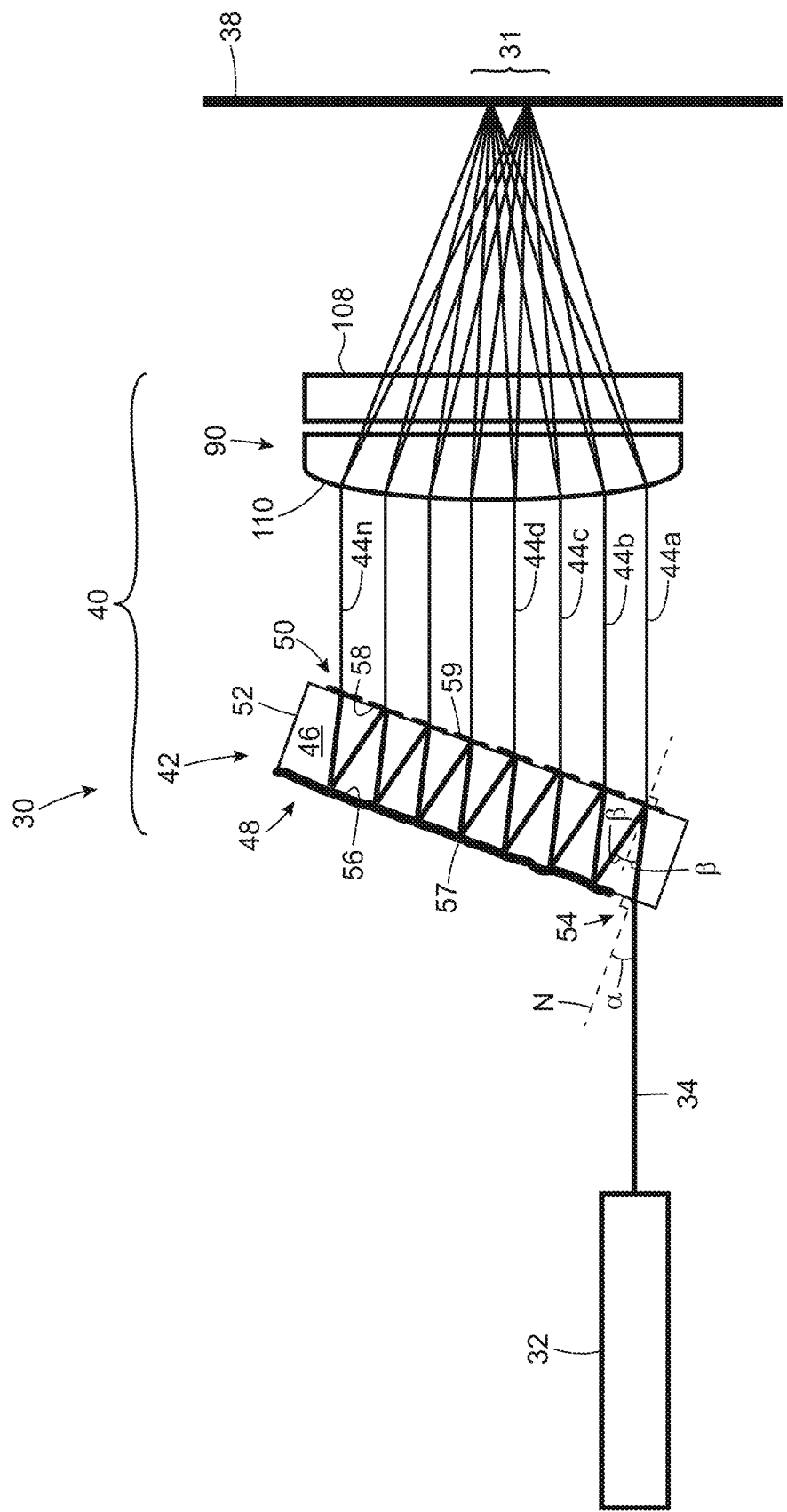
FIG. 13A to 13C schematically illustrate configurations including a sub-beam converter based on a cylindrical lens combined with a beam conditioning block.
Figure 13B:
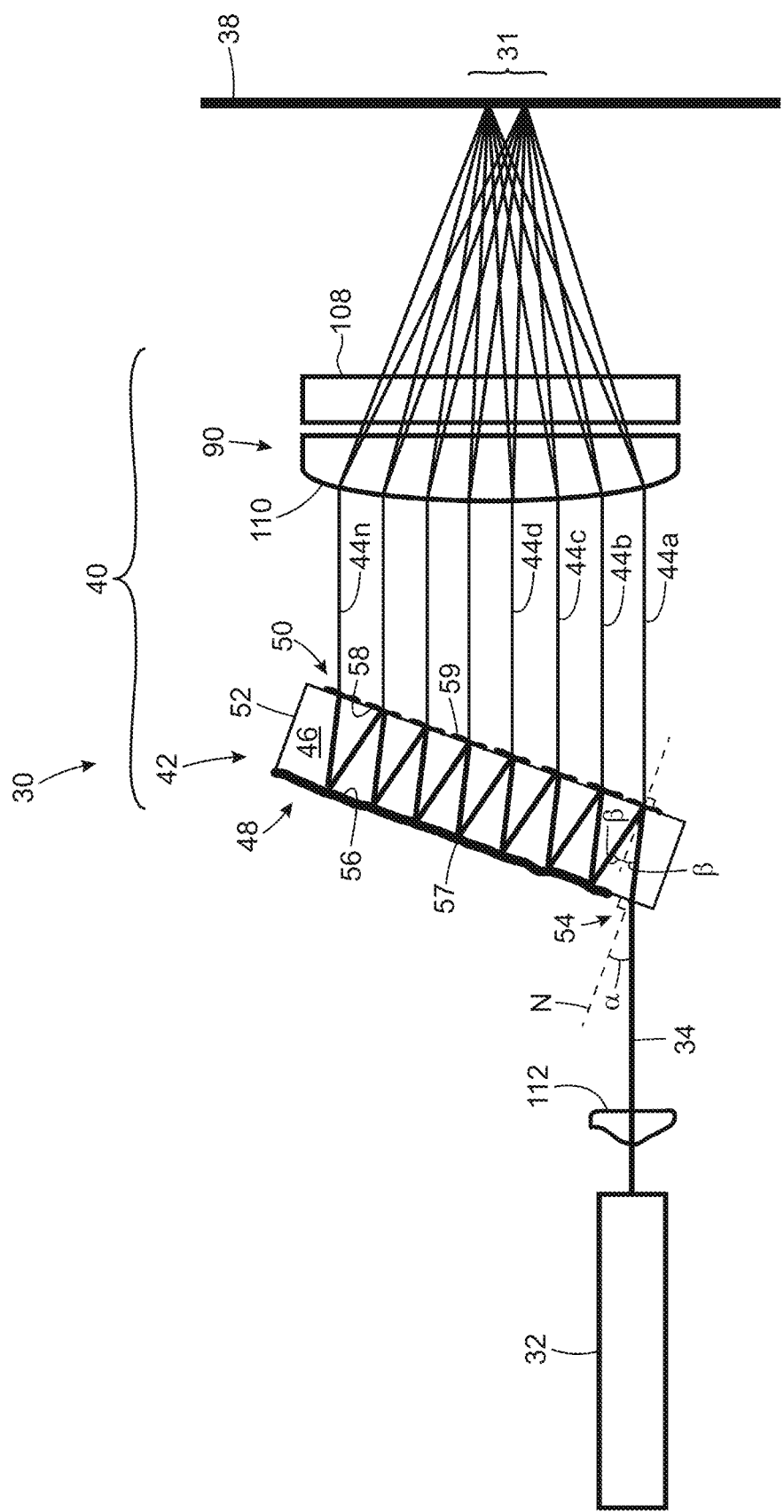
Figure 13C:
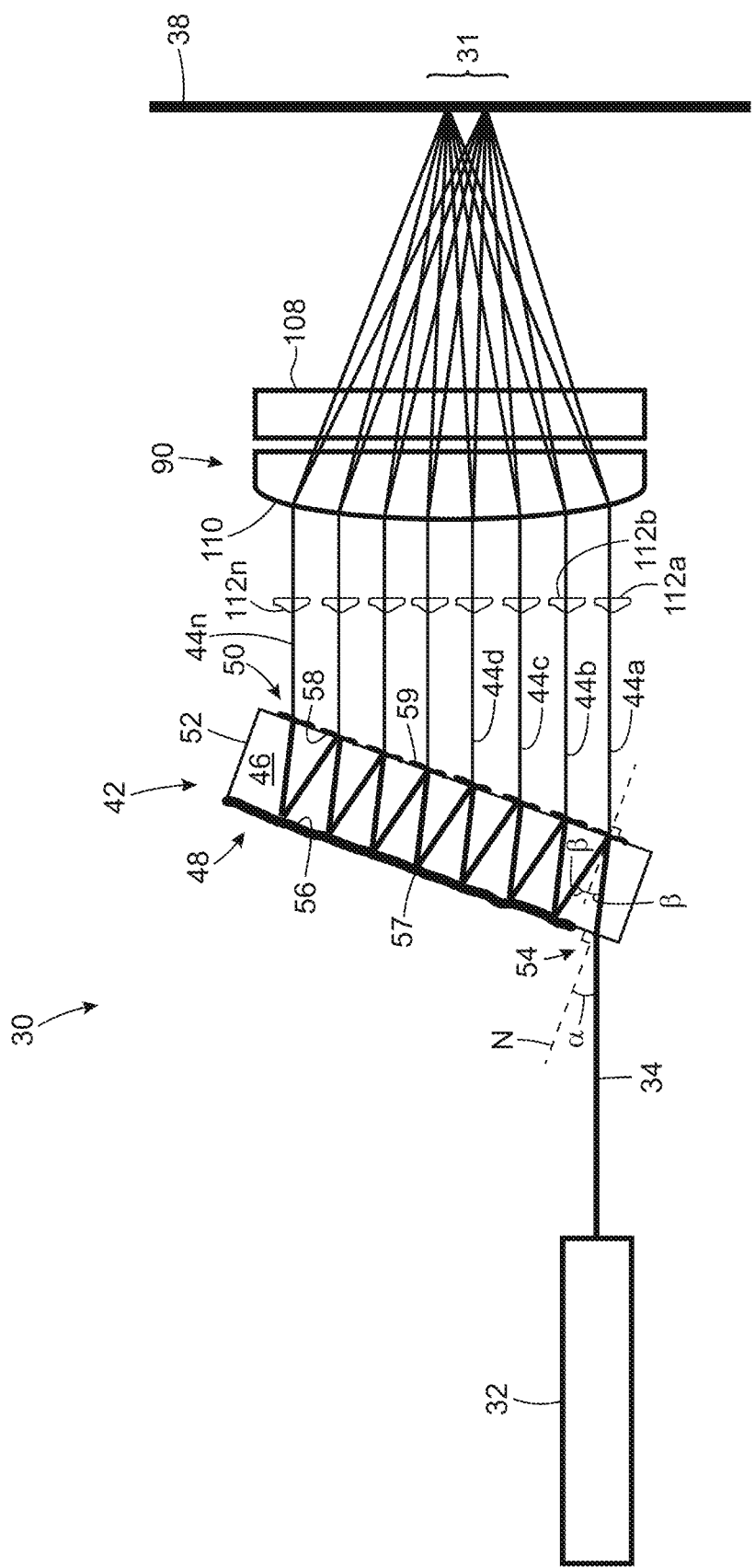

Referring to FIGS. 13A to 13C, there is shown yet another implementation of a laser line generating assembly 30, of particular use for generating shorter lines than previous embodiments.

In all illustrated variants of this implementation, the illustrated laser line generating assembly 30 includes a laser source 32 generating a laser beam 34 having a temporal coherence characterized by a coherence length. The laser source 32 may for example be embodied by a gas laser, a solid-state laser, a fiber laser, a dye laser or a semiconductor (diode) laser. In some implementations, the laser source is embodied by a laser diode, such as for example a Fabry-Perot (FP) laser diode, a Distributed Feedback (DFB laser diode), a Distributed Bragg Reflector (DBR) laser diode, a Quantum Cascade (QCL) laser diode, Vertical Cavity Surface Emitting Lasers (VCSELs) laser diode, or the like. In some implementations, the configuration of FIG. 12 may be adapted for use with a singlemode laser diode as the laser source 32, although a multimode laser diode may also be used.

The laser line generating assembly 30 according to the implementation of FIGS. 13A to 13C may include a beam divider such as for example shown in any one of FIGS. 3A to 3D or equivalents thereof. The laser line generating assembly 30 as illustrated includes a high reflectivity reflector or back reflector 48, and a partially reflective reflector or front reflector 50, extending in parallel and defining a light cavity 46 therebetween. By way of example, the light cavity 46 may include a rectangular transparent block 52, and the high reflectivity reflector 48 and the partially reflective reflector 50 may be defined by reflective coating layers 57, 59 provided along respective back and front surfaces 56, 58 of the rectangular transparent block 52. The reflective coating layers 57, 59 may be a metallic or dielectric component, as mentioned above. The reflective coating layer 59 defining the partially reflective reflector 50 may have a varying thickness along the front surface 58 of the rectangular transparent block 56. The light cavity 46 has a light input 54 configured to receive the laser beam 34 downstream from the line-generating lens 112, so that the laser beam 34 is reflected within the light cavity 46 for multiple passes. The light input 54 may be positioned to receive the laser beam 34 within the light cavity 46 at an input angle α having a non-zero value with respect to a normal N to a plane of the high reflectivity reflector 48. In some embodiments, the light input may consist of a portion of the back surface 56 of the rectangular transparent block 52 free of the reflective coating layer 57 defining the high reflectivity reflector 48. The laser beam 34 has an optical path within each of the multiple passes longer than the coherence length, as explained above. Each passe generates one of multiple incoherent sub-beams 44a, 44b, . . . 44n propagating in a same propagation plane 36. In some variants, the reflective coating layer 59 defining the partially reflective reflector 50 is configured such that all of the sub-beams 44a, 44b, . . . 44n substantially contain a same light power.

Still Referring to FIGS. 13A to 13C, the illustrated laser line generating assembly 30 includes a sub-beam converter 90 is based on a cylindrical lens 110, combined with a beam conditioning block 108. The beam conditioning block 108 may for example be embodied by a cylindrical lens configured and positioned to focus the line on it's thickness axis. The length of the low speckle laser line 31 is the size of the image of the laser source 32 through the laser line generator 40. In the variant of FIG. 13B, an upstream lens, such as for example another cylindrical lens or a line-generating lens 112 such as described above, may be used between the laser source 32 and the beam divider 42 to increase the size of the image of the laser source 32. Alternatively, as shown in FIG. 13C, a series of line-generating lenses 112a, 112b, . . . 112n may be positioned in the paths of the sub-beams 44a, 44b, . . . 44n between the beam divider 42 and the sub-beam converter 90.

Figure 14:
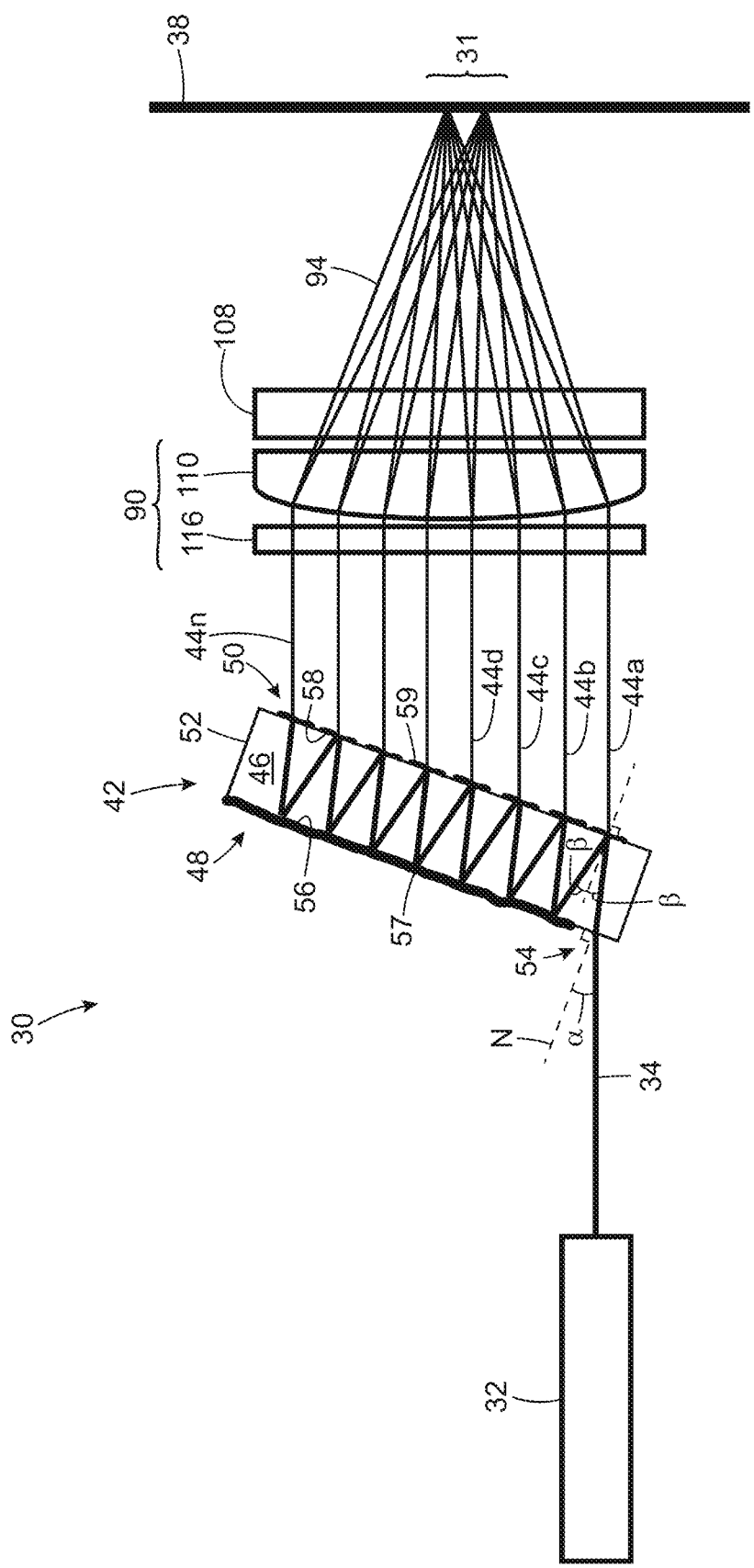
FIG. 14 schematically illustrates a configuration in which the sub-beam converter includes a cylindrical lens and a unidimensional diffuser or grating combined with a beam conditioning block.

FIG. 14 shows a laser line generating assembly 30 for projecting a low-speckle laser line at a projection plane 38, according to another embodiment. The illustrated laser line generating assembly 30 includes a laser source 32 generating a laser beam 34 having a temporal coherence characterized by a coherence length. The laser source 32 may for example be embodied by a gas laser, a solid-state laser, a fiber laser, a dye laser or a semiconductor (diode) laser. In some implementations, the laser source is embodied by a laser diode, such as for example a Fabry-Perot (FP) laser diode, a Distributed Feedback (DFB laser diode), a Distributed Bragg Reflector (DBR) laser diode, a Quantum Cascade (QCL) laser diode, Vertical Cavity Surface Emitting Lasers (VCSELs) laser diode, or the like. In some implementations, the configuration of FIG. 14 may be adapted for use with a singlemode laser diode as the laser source 32, although a multimode laser diode may also be used.

The laser line generating assembly 30 according to the embodiment of FIG. 14 may include a beam divider such as for example shown in any one of FIGS. 3A to 3D or equivalents thereof. In the illustrated example of FIG. 12, the laser line generating assembly 30 includes a high reflectivity reflector or back reflector 48, and a partially reflective reflector or front reflector 50, extending in parallel and defining a light cavity 46 therebetween. By way of example, the light cavity 46 may include a rectangular transparent block 52, and the high reflectivity reflector 48 and the partially reflective reflector 50 may be defined by reflective coating layers 57, 59 provided along respective back and front surfaces 56, 58 of the rectangular transparent block 52. The reflective coating layers 57, 59 may be a metallic or dielectric component, as mentioned above. The reflective coating layer 59 defining the partially reflective reflector 50 may have a varying thickness along the front surface 58 of the rectangular transparent block 56. The light cavity 46 has a light input 54 configured to receive the laser beam 34 downstream from the line-generating lens 112, so that the laser beam 34 is reflected within the light cavity 46 for multiple passes. The light input 54 may be positioned to receive the laser beam 34 within the light cavity 46 at an input angle α having a non-zero value with respect to a normal N to a plane of the high reflectivity reflector 48. In some embodiments, the light input may consist of a portion of the back surface 56 of the rectangular transparent block 52 free of the reflective coating layer 57 defining the high reflectivity reflector 48. The laser beam 34 has an optical path within each of the multiple passes longer than the coherence length, as explained above. Each passe generates one of multiple incoherent sub-beams 44a, 44b, . . . 44n propagating in a same propagation plane 36. In some variants, the reflective coating layer 59 defining the partially reflective reflector 50 is configured such that all of the sub-beams 44a, 44b, . . . 44n substantially contain a same light power.

Figure 15:
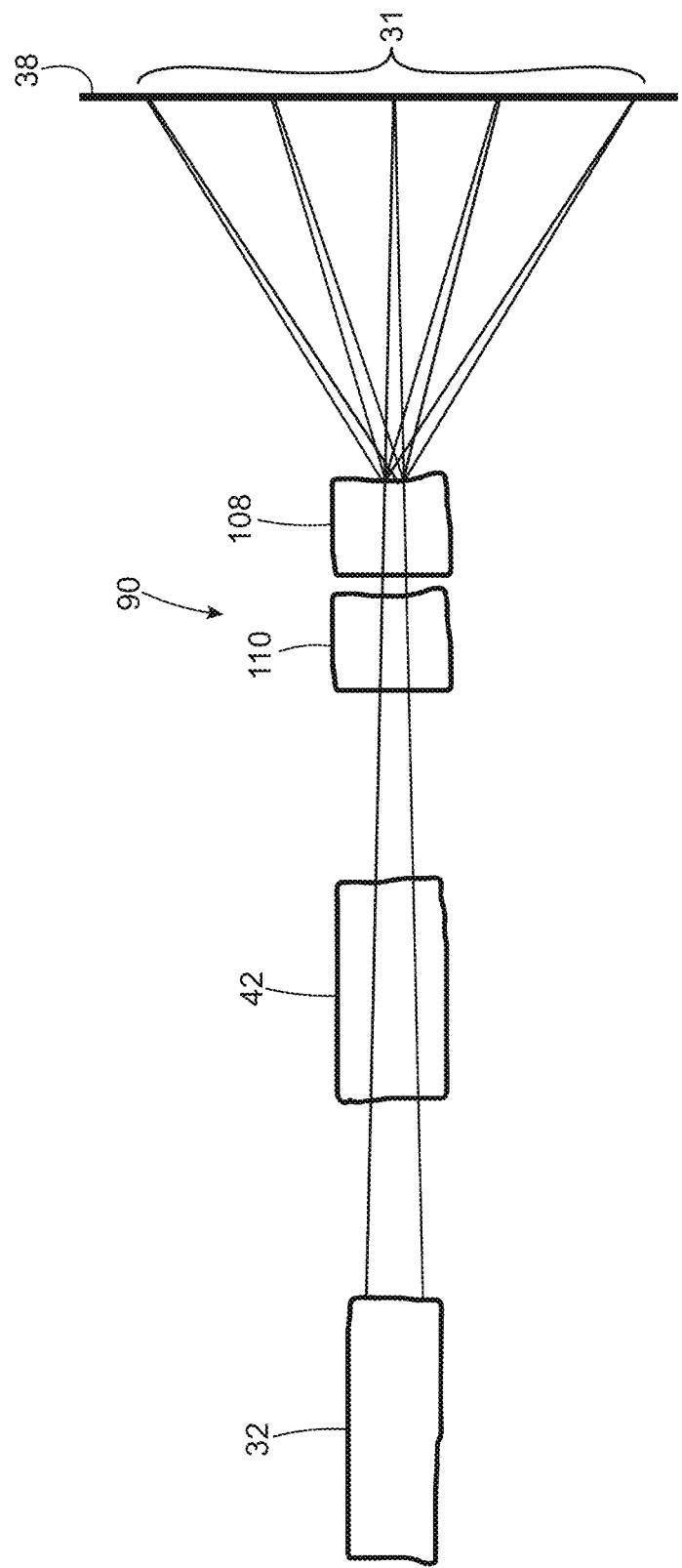
FIG. 15 is a side view of a variant in which the beam conditioning block is embodied by a unidimensional beam-splitter diffraction grating to clone the generated line into a multi-line pattern.

Still Referring to FIG. 14, the illustrated laser line generating assembly 30 includes a sub-beam converter 90 embodied by a cylindrical lens 110 combined with a unidimensional diffuser or a grating 116 so the laser light sheets 94 from the different sub-beams 44 can overlap on the projection plane 38 with a shift between them, homogenizing the resulting power distribution in the low-speckle laser line 31. A beam conditioning block 108 can be provided between the sub-beam converter 90 and the projection plane. Referring to FIG. 15, in another variant, the beam conditioning block 108 may be embodied by a unidimensional beamsplitter diffraction grating to clone the generated line into a multi-line pattern.

Referring to FIGS. 16A and 16B, there is respectively shown a top and a side view of another example of implementation where the end result is a collimated laser line projector. In this variant, the sub-beam converter 90, which is disposed upstream from the beam divider 42, includes a line-generating lens 120 and a focussing cylindrical lens 122 which are used to initially convert an incoming collimated laser beam 34 into an initial light sheet 93 of parallel rays without a point source. The initial light sheet 93 then enters the beam divider 42 to create multiple sub-beams, each already embodying the multiple laser light sheets 94. In this embodiment, the individual laser light sheets 94 are defined by parallel rays and therefore do not have a point source. The laser light sheets 94 are then refocused by a cylindrical lens 110 on the projection plane 38 such that they overlap. The resulting laser line will be collimated because each laser light sheets 94 that overlaps at the projection plane is also collimated.

Figure 17A:
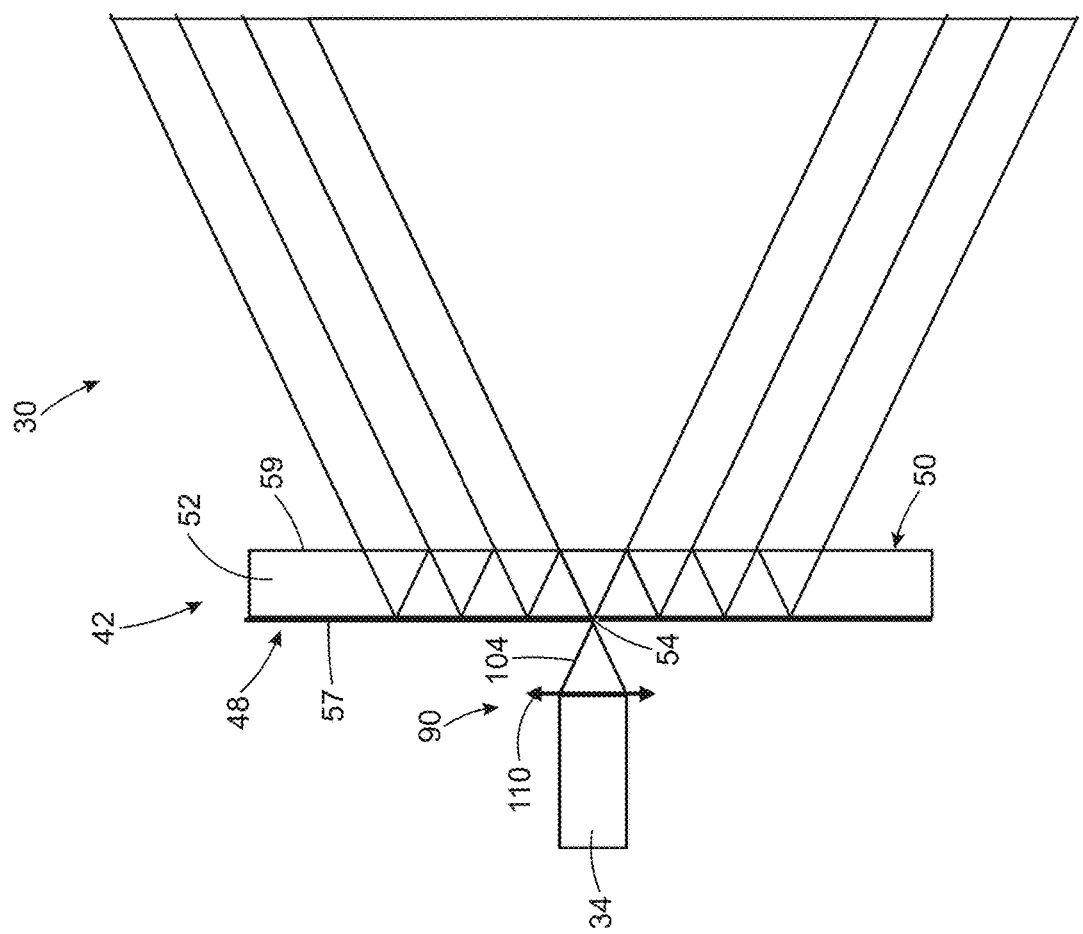
FIG. 17A schematically illustrates a configuration in which the laser beam is spread into a laser light sheet upstream of the beam divider and the beam divider includes a light cavity with a light input positioned about midway along the back reflector.

Referring to FIG. 17A, there is shown another example of configuration of the laser line generating assembly 30. In this example, the beam divider 42 is embodied by a transparent block 52 having a back reflector 48 for example made of a back surface reflective coating layer 57 that is highly reflective and a front reflector 50 for example made of front surface reflective coating layer 59 that is partially reflective. The sub-beam converter 90 is embodied by a cylindrical lens 110 or a line-generating lens as defined above, designed to spread the laser beam 34 into a seed light sheet 104. The beam divider 42 has a light input 54 disposed about midway along the length of the back reflector, for example embodied by a small hole in the back surface reflective coating layer 57. As schematically illustrated in FIG. 17B, the result of this configuration is equivalent to a plurality of point sources 92 disposed at different distances behind the light input 54 of the beam divider 42. The distance between these different point sources provides enough optical path length difference to have incoherent light sheets. Moreover, this distance separation provides the angular diversity between each sub beam in order to create uncorrelated speckle patterns at projection plane and reduce overall speckle.

Figure 17C:
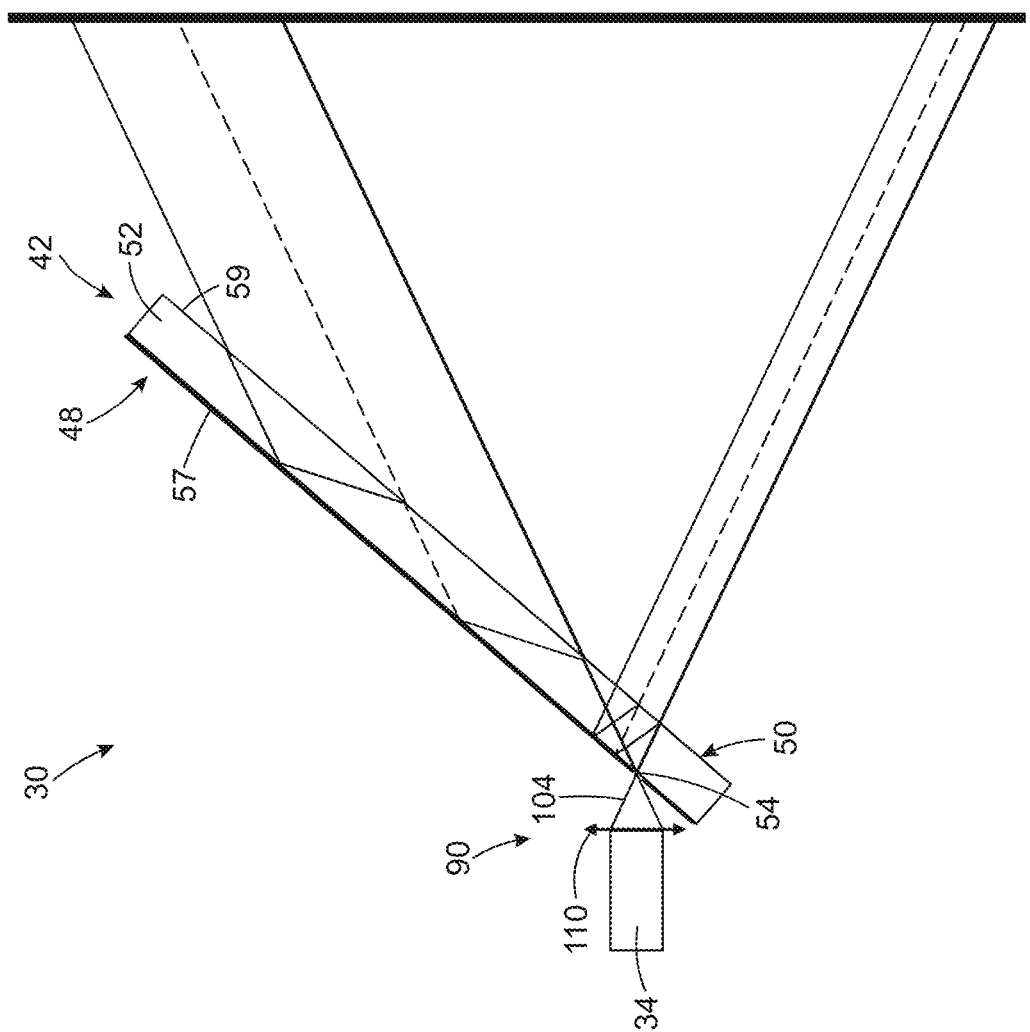
FIG. 17C illustrates a variant of FIG. 17A in which the beam divider is positioned at an angle with respect to the light sheet.
Figure 17D:
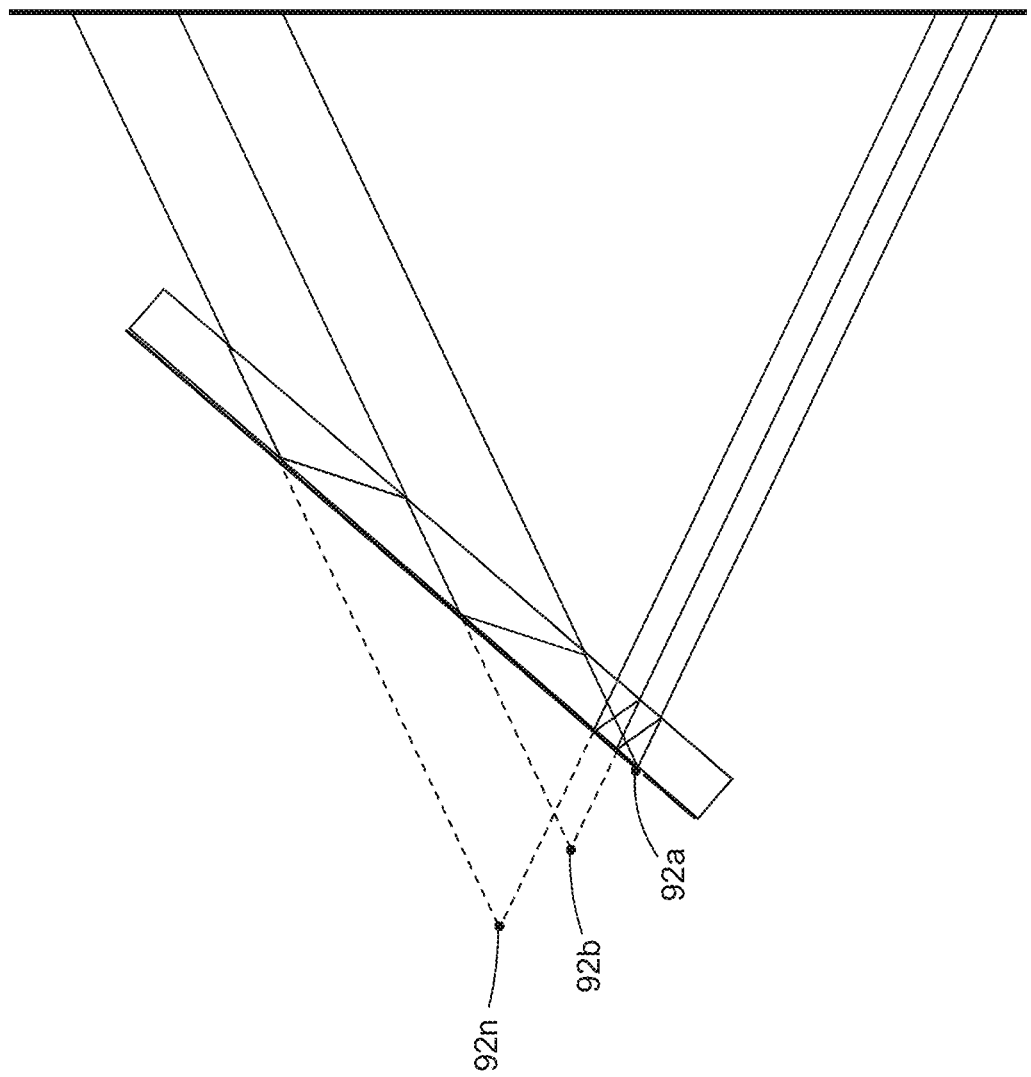
FIG. 17D illustrates the equivalent point sources of the configuration of FIG. 17C.

Referring to FIG. 17C, a similar configuration can be made to 17A, but this time, the beam divider 42 is positioned with a certain angle compared to the seed light sheet 104. Furthermore, the input light sheet 54 entering the beam divider 42 is now more at the bottom of the divider 42 instead of around the center. The addition of this angle creates a separation in the point sources in the x axis as well as the z axis, seen in FIG. 17D. This position separation is favorable for angular diversity between each sub-beam at all positions on the generated line 38. Preferably, the angle of incidence of the light sheet should be larger than about half of the light sheet's full divergence angle.

Of course, numerous modifications could be made to the embodiments described herein without departing from the scope of protection.

The invention claimed is:

1. A laser line generating assembly for projecting a low-speckle laser line at a projection plane, the laser line generating assembly comprising:
   a laser source generating a laser beam having a temporal coherence characterized by a coherence length;
   a high reflectivity reflector and a partially reflective reflector extending in parallel and defining a light cavity therebetween, the light cavity having a light input configured to receive the laser so that said laser beam is reflected within said light cavity for multiple passes, the laser beam having an optical path within each of said passes longer than the coherence length, each of said passes generating one of multiple incoherent sub-beams propagating in a same propagation plane;
   a line-generating lens disposed in a path of the laser beam between the laser source and the light cavity and designed to fan out said laser beam in one direction within the propagation plane, each of the multiple sub-beams therefore having a fanned-out shape within said propagation plane; and
   a bulk diffraction grating positioned across the propagation plane so as to intersect said multiple sub-beams, said bulk diffraction grating diffracting each sub-beam into a plurality of diffraction orders spread across said one direction within the propagation plane, thereby providing a plurality of images of said sub-beam;
   whereby the plurality of images of each sub-beam forms a corresponding laser light sheet extending within the propagation plane, the laser light sheets intersecting the projection plane to define laser line elements overlapping at least partially to form said low-speckle laser line, the laser line elements having respective speckle patterns which are at least partially uncorrelated.

2. The laser line generating assembly according to claim 1, wherein the laser source is a laser diode.

3. The laser line generating assembly according to claim 1, wherein the light cavity comprises a rectangular transparent block, and the high reflectivity reflector and the partially reflective reflector being defined by reflective coating layers provided along respective back and front surfaces of the rectangular transparent block.

4. The laser line generating assembly according to claim 3, wherein the reflective coating layers are metallic or dielectric components.

5. The laser line generating assembly according to claim 3, wherein the reflective coating layer defining the partially reflective reflector is configured such that all of the sub-beams substantially contain a same light power.

6. The laser line generating assembly according to claim 3, wherein the reflective coating layer defining the partially reflective reflector has a varying thickness along the front surface.

7. The laser line generating assembly according to claim 3, wherein the light input consists of a portion of the back surface of the rectangular transparent block free of the reflective coating layer defining the high reflectivity reflector.

8. The laser line generating assembly according to claim 1, wherein the light input is positioned to receive the laser beam within the light cavity at an input angle $\alpha$ having a non-zero value with respect to a normal N to a plane of the high reflectivity reflector.

9. The laser line generating assembly according to claim 1, wherein the line-generating lens is an acylindrical lens.

10. The laser line generating assembly according to claim 1, wherein the line-generating lens is a linear deiverging lens.

11. The laser line generating assembly according to claim 1, wherein the bulk diffraction grating comprises a planar glass substrate and a holographic pattern engraved or photoinduced in said planar glass substrate.

12. The laser line generating assembly according to claim 1, wherein the bulk diffraction grating comprises a planar glass substrate and a plurality of metasurfaces deposited on a surface of said planar glass substrate.

13. A laser line generator for projecting a low-speckle laser line at a projection plane, the laser line generator configured to received as input a laser beam having a temporal coherence characterized by a coherence length, the laser line generator comprising:
   a high reflectivity reflector and a partially reflective reflector extending in parallel and defining a light cavity therebetween, the light cavity having a light input configured to receive the laser beam from the line-generating lens so that said laser beam is reflected within said light cavity for multiple passes, the laser beam having an optical path within each of said passes longer than the coherence length, each of said passes generating one of multiple incoherent sub-beams propagating in a same propagation plane;
   a line-generating lens disposed in a path of the laser beam between the laser source and the light cavity and designed to fan out said laser beam in one direction within the propagation plane, each of the multiple sub-beams therefore having a fanned-out shape within said propagation plane; and
   a bulk diffraction grating positioned across the propagation plane so as to intersect said multiple sub-beams, said bulk diffraction grating diffracting each sub-beam into a plurality of diffraction orders spread across said one direction within the propagation plane, thereby providing a plurality of images of said sub-beam;
   whereby the plurality of images of each sub-beam forms a corresponding laser light sheet extending within the propagation plane, the laser light sheets intersecting the projection plane to define laser line elements overlapping at least partially to form said low-speckle laser line, the laser line elements having respective speckle patterns which are at least partially uncorrelated.

14. The laser line generator according to claim 13, wherein the light cavity comprises a rectangular transparent block, and the high reflectivity reflector and the partially reflective reflector being defined by reflective coating layers provided along respective back and front surfaces of the rectangular transparent block.

15. The laser line generator according to claim 14, wherein the reflective coating layers are metallic or dielectric components.

16. The laser line generator according to claim 14, wherein the reflective coating layer defining the partially reflective reflector is configured such that all of the sub-beams substantially contain a same light power.

17. The laser line generator according to claim 14, wherein the reflective coating layer defining the partially reflective reflector has a varying thickness along the front surface.

18. The laser line generator according to claim 14, wherein the light input consists of a portion of the back surface of the rectangular transparent block free of the reflective coating layer defining the high reflectivity reflector.

19. The laser line generator according to claim 13, wherein the light input is positioned to receive the laser beam within the light cavity at an input angle $\alpha$ having a non-zero value with respect to a normal N to a plane of the high reflectivity reflector.

20. The laser line generator according to claim 13, wherein the line-generating lens is an acylindrical lens.

21. The laser line generator according to claim 13, wherein the line-generating lens is a linear deiverging lens.

22. The laser line generator according to claim 13, wherein the bulk diffraction grating comprises a planar glass substrate and a holographic pattern engraved or photoinduced in said planar glass substrate.

* * * * *